(12) United States Patent
Habashi et al.

(10) Patent No.: US 8,556,405 B2
(45) Date of Patent: Oct. 15, 2013

(54) INK FOR RECORDING, AND INK CARTRIDGE, INK RECORDED MATTER, INKJET RECORDING APPARATUS AND INKJET RECORDING METHOD USING THE SAME

(75) Inventors: Hisashi Habashi, Isehara (JP);
Michihiko Namba, Yokohama (JP);
Mariko Kojima, Komae (JP); Akihiko Gotoh, Atsugi (JP); Tamotsu Aruga, Isehara (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/214,487

(22) Filed: Aug. 22, 2011

(65) Prior Publication Data

US 2011/0300353 A1 Dec. 8, 2011

Related U.S. Application Data

(62) Division of application No. 12/064,418, filed as application No. PCT/JP2006/316805 on Aug. 22, 2006, now Pat. No. 8,044,114.

(30) Foreign Application Priority Data

Aug. 23, 2005 (JP) ................. 2005-241860

(51) Int. Cl.
| | |
|---|---|
| B32B 9/04 | (2006.01) |
| B41J 2/01 | (2006.01) |
| B41J 2/17 | (2006.01) |
| B41J 2/175 | (2006.01) |
| B41M 5/00 | (2006.01) |
| G01D 11/00 | (2006.01) |

(52) U.S. Cl.
USPC ............... 347/100; 347/1; 347/85; 347/95; 428/32.1; 428/411.1

(58) Field of Classification Search
USPC .............. 347/1, 85, 95, 100; 428/32.1, 411.1
See application file for complete search history.

(56) References Cited

U.S. PATENT DOCUMENTS

| | | | |
|---|---|---|---|
| 5,928,419 A | 7/1999 | Uemura et al. | |
| 6,087,416 A * | 7/2000 | Pearlstine et al. | 523/160 |
| 6,846,851 B2 * | 1/2005 | Nakhmanovich et al. | 522/84 |
| 2001/0045175 A1 | 11/2001 | Ouchi et al. | |
| 2003/0069329 A1 | 4/2003 | Kubota et al. | |
| 2003/0078320 A1 | 4/2003 | Yatake | |
| 2004/0020407 A1 | 2/2004 | Kato | |
| 2004/0138337 A1 | 7/2004 | Hasegawa et al. | |
| 2004/0249018 A1 | 12/2004 | Kataoka et al. | |
| 2005/0004261 A1 | 1/2005 | Yatake | |
| 2006/0176349 A1 | 8/2006 | Nagai et al. | |
| 2007/0221078 A1 | 9/2007 | Namba et al. | |
| 2008/0273045 A1 | 11/2008 | Morohoshi | |
| 2009/0068131 A1 * | 3/2009 | Malnou | 424/61 |

FOREIGN PATENT DOCUMENTS

| | | |
|---|---|---|
| CN | 1578735 A | 2/2005 |
| JP | 55-069464 | 5/1980 |
| JP | 55-084670 | 6/1980 |
| JP | 55-157668 | 12/1980 |
| JP | 58-072460 | 4/1983 |
| JP | 62-1426 | 1/1987 |
| JP | 62-130863 | 6/1987 |
| JP | 62-130864 | 6/1987 |
| JP | 04-018462 | 1/1992 |
| JP | 04-211478 | 8/1992 |
| JP | 04-332774 | 11/1992 |
| JP | 09-111166 | 4/1997 |
| JP | 2667401 | 6/1997 |
| JP | 2675001 | 7/1997 |
| JP | 2867491 | 12/1998 |
| JP | 2000-095983 | 4/2000 |
| JP | 2000-191972 | 7/2000 |
| JP | 3088588 | 7/2000 |
| JP | 2001-262025 | 9/2001 |
| JP | 2002-301857 | 10/2002 |
| JP | 2002-337449 | 11/2002 |
| JP | 2003-192956 | 7/2003 |
| JP | 2003-226827 | 8/2003 |
| JP | 2003-268274 | 9/2003 |
| JP | 2003-277658 | 10/2003 |
| JP | 2004-035718 | 2/2004 |
| JP | 2004-091610 | 3/2004 |
| JP | 2004-098577 | 4/2004 |
| JP | 2004-099800 | 4/2004 |
| JP | 2004-155867 | 6/2004 |
| JP | 2004-169008 | 6/2004 |
| JP | 2004-203903 | 7/2004 |
| JP | 2004-238573 | 8/2004 |
| JP | 2005-139330 | 6/2005 |
| WO | WO 01/08895 A1 | 2/2001 |
| WO | WO 02/26898 A1 | 4/2002 |
| WO | WO 2007/023987 A1 | 3/2007 |

OTHER PUBLICATIONS

Ricoh Group Annual Report 2004 Ricoh Group Sustainability Report (Economy), pp. 1-60, available from http://www.ricoh.com/IR/financial_data/annual_report/ar/04/ar00.pdf#page=13, published Jun. 2004.*
Japanese Office Action issued Dec. 6, 2011, in Patent Application No. 2006-226097.
Japanese Information Offer Form issued Mar. 14, 2012, in Patent Application No. 2006-226097 (with partial English-language translation).
European Official Communication issued in corresponding European application No. 06 796 839.6 dated Jun. 20, 2013.

* cited by examiner

*Primary Examiner* — Patrick Niland
(74) *Attorney, Agent, or Firm* — Oblon, Spivak, McClelland, Maier & Neustadt, L.L.P.

(57) ABSTRACT

There is provided an ink for recording, which contains: a coloring agent; a water-dispersible resin; a wetting agent; a surfactant; and water, wherein a total solid content of the coloring agent and the water-dispersible resin is 10% by mass to 30% with respect to a total mass of the ink, a ratio B/C is 0.1 to 1.6 where B is a solid content of the coloring agent in the ink, and C is a solid content of the water-dispersible resin in the ink, a viscosity of the ink is 5 mPa·s to 20 mPa·s at 25° C., and a surface tension of the ink is 35 mN/m or less.

17 Claims, 8 Drawing Sheets

INK FOR RECORDING, AND INK CARTRIDGE, INK RECORDED MATTER, INKJET RECORDING APPARATUS AND INKJET RECORDING METHOD USING THE SAME

REFERENCE TO PRIOR APPLICATIONS

This application is a Division of U.S. application Ser. No. 12/064,418, filed Feb. 21, 2008; which is a 371 of PCT/JP2006/316805, filed Aug. 22, 2006. Priority to Japanese patent application 2005-241860, filed Aug. 23, 2005, is claimed.

TECHNICAL FIELD

The present invention relates to an ink for recording, which achieves good image quality on plain paper, high coloring property, high image quality, and reliability, and is suitably applied for inkjet recording. The present invention also relates to an ink cartridge, an ink recorded matter, an inkjet recording apparatus and an inkjet recording method using the ink for recording.

BACKGROUND ART

As image forming apparatuses such as printers, facsimiles and copying machines, inkjet recording apparatuses have been known. The inkjet recording apparatus performs the recording by ejecting the ink from a recording head onto a recording medium such as paper, and has advantages in that a making image process is simple and thus the apparatus is easily simplified, the apparatus saves energy and is environmentally friendly because it has no heating process, high-definition images can be recorded at high speed, running cost is inexpensive, noise is low and it is easy to record color images using a multicolor ink.

As such an ink used for the inkjet recording, aqueous inks in which water is a major ingredient, and coloring agents, wetting agents such as glycerin, permeating agents which control permeability into the recording paper, surfactants, and other additives are contained therein have been generally used at home and offices.

Generally, the inkjet recording using the aqueous ink is fixed by permeating the liquid ink into the recording medium. Thus, the paper made specifically for the inkjet printer having enhanced absorbability, fixation of coloring components on the paper surface and protection functions of the coloring components has been developed. However, the paper made specifically for the inkjet printer is expensive because multiple application steps are required after paper making, and is inferior to the plain paper in recycle property because many processing chemicals are used. Thus, it is desired to obtain the sufficient image quality on the plain paper.

Such plain paper is inferior in ink absorbability compared with the paper made specifically for the inkjet printer, and does not assist ink performances as the specifically made paper does, and thus has the following problems. That is, (1) occurrence of feathering, (2) occurrence of bleeding, (3) reduction of density, (4) reduction of color forming property, (5) reduction of water resistance, (6) reduction of light resistance, (7) reduction of gas resistance, (8) reduction of fixing property, (9) show through of ink, and the like. It is an important problem for the inkjet recording on the plain paper to solve the above problems.

Recently, pigments have been frequently used for the inkjet ink because dispersibility has been improved and particle diameters have been minimized. As the improvement of the dispersibility of the pigment, not only pigment is dispersed using surfactants and water soluble resins as conventional cases, but also hydrophilicity is imparted to the pigment surface by surface modification such as oxidation, sulfonation or graft polymerization. Thus, self dispersion stability of the pigment is enhanced. By the use of such pigments, the above (5), (6) and (7) can be improved, but the pigment is inferior to dyes in density and color forming property, and further inferior to dye inks in terms of reliability of jet stability, long term storage stability and redispersibility. Thus, when the pigment is used as the coloring agent, it is the problem to enhance the density, the color forming property and the reliability.

In order to address these problems, for example, the inks for the inkjet recording using colored polymer particles, particularly emulsion of polyester or vinyl based polymer particles have been often reported (see Patent Document 1). These include the ink containing a coloring agent including resin dispersion body in which the coloring agent has been included in a water insoluble dispersible resin. When a color organic pigment is used as the coloring agent, it has been known that this pigment is more excellent in image density and color reproducibility on the plain paper in an ink formulation known publicly and conventionally than the pigment ink using an aqueous dispersant.

Conventionally, in order to reduce the feathering and the bleeding, enhance the printing density and the color forming property and suppress the show through, the technology which controls the permeability of the ink into the paper has been studied. Among the inkjet inks in the market, there is a superpermeable ink where the permeability into the paper has been enhanced by adjusting a surface tension of the ink to less than 35 mN/m. Such an ink has highly effective for reducing the bleeding and is good in drying property in printing on the plain paper, but has shortcomings in that the feathering easily occurs, the printing density is low and letter quality is easily deteriorated. Meanwhile, a slowly permeable ink where the ink is retained on a printing surface layer by adjusting the surface tension of the ink to more than 35 mN/m to slow the permeation into the paper has been placed on the market. This is highly effective for the reduction of the feathering, the enhancement of the printing density, the enhancement of the color forming property and the reduction of the show through. However, in this slowly permeable ink, as a result of reducing the permeability into the paper, the drying property on the plain paper after printing is remarkably poor, leading to deterioration of the fixing property and the bleeding between colors when multiple colors are used.

Thus, the technique to suppress the bleeding between the colors and assure the image quality using an ink set by combining the above slowly permeable ink and the above superpermeable ink has been developed. However, when the printing on both sides is performed using this ink set, a time to wait for drying the ink after the printing is required, leading to the deterioration of productivity in the printing on both sides. Various inkjet recording apparatuses having a device to facilitate the ink dry by heating the paper surface with a heater before and after the printing for enhancing the ink drying property have been proposed and placed on the market (see Patent Documents 2, 3, 4, 5 and 6).

These proposals are problematic in that the advantages of the inkjet mode are lost, i.e., because of having a heating means, the apparatus grows in size and is complicated, and the energy for heating is wasted.

In addition to the above, for the inkjet inks, methods combining both the enhanced reliability and the enhanced image quality have been studied. Many inkjet inks are designed to minimize the increase of viscosity in order to prevent nozzle clogging. For example, in Patent Document 7, it has been described that by making the viscosity change within 10 times and making the particle diameter change within 3 times when the ink is concentrated to 2 times, it is possible to prevent aggregation of the pigments from suppressing spread of the ink to prevent white spotting. However, by this ink, it is difficult to form high quality images on the plain paper. Also in Patent Document 8, the ink where a residual component after evaporating a volatile component in the ink is a liquid and its viscosity is within 10 times of the initial viscosity has been proposed. However, this ink is the dye ink, and although the reliability is high, the image quality on the plain paper is inferior. In Patent Document 9, the ink where the ink viscosity is within 600 times or less before the evaporation when water is evaporated under the environment at 60° C. has been disclosed. However, this ink is also the dye ink, and the reliability of the ink and durability of the image quality are balanced by adding a water soluble polymer, but the water resistance remains problematic. In Patent Document 10, it has been proposed that the ink whose viscosity is 5 to 15 mPa·s is required for assuring the high image quality, and that a particular compound as a viscosity adjuster for adjusting an initial evaporation rate to assure the reliability and adjusting the viscosity is added. However, in this proposal, there is no description for the stability of the pigment particle diameter used, there is the reliability after leaving stand for 24 hours, but the ink is inferior in reliability depending on the constitution of the ejecting head and the size of the nozzle when left stand for a longer time.

This way, it is necessary to use the ink with high viscosity for assuring the printing quality with the high speed and high quality, but in the ink with high viscosity, it is difficult to assure the reliability.

For the purpose of improving the image quality, for example, in Patent Documents 11 and 12, the technique in which a water insoluble resin is added to the pigment ink has been proposed. In Patent Document 13, the technique in which the high quality image is obtained on the plain paper by the ink where a ratio of the pigment to a resin emulsion is in the range of 1:0.1 to 1:1 and an average particle diameter of the coloring component is 0.3 to 1.2 μm has been proposed. However, in such an ink where the resin emulsion has been added, the bleeding is suppressed and the feathering can be suppressed, but the image density is insufficient and the reliability as the inkjet ink is not sufficient. In Patent Document 14, the ink where a lowest film-forming temperature of the ink in which the water insoluble resin has been added is 40° C. or above has been disclosed. In Patent Document 15, the ink where the particle diameter of the added emulsion is 50 nm or less has been disclosed. However, there is a room to improve the reliability, and the resulting image quality is not sufficient. In Patent Document 16, it has been disclosed that printing unevenness is improved by the ink containing the pigment, saccharides or a derivative thereof, a polyol compound having 5 or more hydroxyl groups and a resin emulsion. However, in this ink, the permeability into the plain paper is low, and there are problems such as occurrences of feathering and bleeding, deterioration of the fixing property and slow drying. In Patent Document 17, the ink where a solid content composed of a water-dispersible resin and a self dispersible pigment is 1.0% to 16% by mass has been disclosed. It has been set forth that the image quality is improved on the plain paper, and the water resistance is further improved compared with the dye ink, but an image retention performance for a marker pen frequently used on the plain paper is not sufficient.

When the pigment dispersion body and the resin emulsion are added to the ink, the solid content is increased to increase the viscosity. For example, in Patent Document 18, the formulation where the increase of the viscosity is low even when the solid content is increased by adding the resin which forms a micelle association body has been proposed. However, in this proposed ink, the permeability into the plain paper is short, and the recorded image quality is problematic as is the case with Patent Document 16.

The permeability for the paper is described by capillary absorption represented by Lucas-Washburn formula, and the higher the viscosity is, the sufficient permeability is not obtained unless the surface tension and a contact angle of the paper and the ink are made low. For example, in Patent Documents 19 and 20, when the permeability is enhanced by using polyhydric alcohol alkyl ether for the ink with high solid content concentration, the solid content is increased to increase the viscosity, and the sufficient permeability is not obtained to reduce the image quality.

It has been known that a silicone based surfactant and a fluorine based surfactant in a trace amount enhance the permeability. For example, in Patent Documents 21 and 22, the inkjet ink in which the fluorine based surfactant has been added has been proposed. Also in Patent Documents 23 and 24, the ink containing the pigment dispersion body and the fluorine based surfactant has been proposed. In Patent Document 25, the ink with a viscosity of 5 mPa·s containing the fluorine based surfactant and a polymer emulsion containing a water insoluble or water hardly soluble color material in polymer fine particles has been proposed. However, in these proposals, preferable hue is not difficult to be contained at high pigment concentration, and the self dispersion pigment can not be said to be sufficiently water resistant and have the sufficient fixing property.

Therefore, for the problems in the inkjet recording on the plain paper, various improvements have been attempted, e.g., the water resistance, the light resistance and the gas resistance are enhanced by using the water-dispersible coloring agent, or the image density is enhanced, the ink show through is reduced and the image quality is improved to suppress the feathering and the bleeding by using the ink having the high permeability and the high viscosity. However, it is an actual circumstance that no ink having sufficiently satisfied performance has been provided yet and the problems remain in color forming property.

[Patent Document 1] Japanese Patent Application Laid-Open (JP-A) No. 2000-191972
[Patent Document 2] JP-A No. 55-69464
[Patent Document 3] JP-A No. 55-84670
[Patent Document 4] JP-A No. 58-72460
[Patent Document 5] JP-A No. 62-130863
[Patent Document 6] JP-A No. 62-130864
[Patent Document 7] JP-A No. 2002-337449
[Patent Document 8] JP-A No. 2000-95983
[Patent Document 9] JP-A No. 09-111166
[Patent Document 10] JP-A No. 2001-262025
[Patent Document 11] JP-A No. 55-157668
[Patent Document 12] Japanese Patent Publication Laid-Open (JP-B) No. 62-1426
[Patent Document 13] JP-A No. 04-332774
[Patent Document 14] Japanese Patent (JP-B) No. 2867491
[Patent Document 15] JP-A No. 04-18462
[Patent Document 16] JP-B No. 3088588
[Patent Document 17] JP-A No. 2004-35718
[Patent Document 18] JP-A No. 2004-99800
[Patent Document 19] JP-A No. 2004-155867
[Patent Document 20] JP-A No. 2004-203903

[Patent Document 21] JP-B No. 2675001
[Patent Document 22] JP-B No. 2667401
[Patent Document 23] JP-A No. 04-211478
[Patent Document 24] JP-A No. 2003-277658
[Patent Document 25] JP-A No. 2003-226827

DISCLOSURE OF INVENTION

It is an object of the present invention to provide an ink for recording, especially suitable for inkjet recording, wherein a solid content of a coloring agent and a water-dispersible resin is increased with respect to the total mass of the ink, and a solid content of the water-dispersible resin is optimized relative to a solid content of the coloring agent to assure a permeability of the ink, thereby achieving high coloring property, high image quality, and reliability. Another object of the present invention is to provide an ink cartridge, an ink recorded matter, an inkjet recording apparatus and an inkjet recording method using the ink for recording.

Means for solving the above problems are as follows:

<1> An ink for recording, containing: a coloring agent; a water-dispersible resin; a wetting agent; a surfactant; and water, wherein a total solid content of the coloring agent and the water-dispersible resin is 10% by mass to 30% by mass with respect to a total mass of the ink, a ratio B/C is 0.1 to 1.6 where B is a solid content of the coloring agent in the ink, and C is a solid content of the water-dispersible resin in the ink, a viscosity of the ink is 5 mPa·s to 20 mPa·s at 25° C., and a surface tension of the ink is 35 mN/m or less.

<2> The ink for recording according to <1>, wherein the coloring agent is a water-dispersible coloring agent containing a pigment.

<3> The ink for recording according <2>, wherein the water-dispersible coloring agent is the pigment which contains at least one hydrophilic group on a surface thereof, and exhibits water dispersibility and/or water solubility in the absence of a dispersant.

<4> The ink for recording according to <2>, wherein the water-dispersible coloring agent is a polymer emulsion containing polymer particles, each of the polymer particles containing a water insoluble coloring agent and/or a coloring agent having poor water solubility.

<5> The ink for recording according to <2>, wherein the water-dispersible coloring agent is the pigment dispersed in either a surfactant or a water-soluble macromolecular compound having a weight average molecular weight of 50,000 or less.

<6> The ink for recording according to any one of <1> to <5>, wherein the wetting agent is polyhydric alcohol having an equilibrium moisture content of 25% by mass or more under the condition of 20° C. and 60% RH.

<7> The ink for recording according to <6>, wherein the polyhydric alcohol is glycerin, and a content of the glycerin is 60% by mass or less with respect to the total mass of the entire wetting agent.

<8> The ink for recording according to any one of <1> to <7>, wherein the surfactant contains at least one selected from the group consisting of a silicone surfactant and a fluorine surfactant, and the total content of the surfactant in the ink is 0.01% by mass to 5% by mass.

<9> The ink for recording according to <8>, wherein the fluorine surfactant is at least one selected from the group consisting of a perfluoroalkyl sulfonate compound, a perfluoroalkyl carboxylate compound, a perfluoroalkyl phosphoric ester compound, a perfluoroalkyl ethylene oxide adduct, and polyoxyalkylene ether polymer having a perfluoroalkyl ether group in a side chain thereof.

<10> The ink for recording according to any one of <1> to <9>, wherein the ink is at least one selected from the group consisting of a cyan ink, a magenta ink, a yellow ink and a black ink.

<11> An ink cartridge, containing a container, and the ink for recording according to any one of <1> to <10> housed in the container.

<12> An inkjet recording method, containing: applying a stimulus to the ink for recording according to any one of claims 1 to 10 so as to eject the ink, and to form an image.

<13> The inkjet recording method according to <12>, wherein the stimulus is at least one selected from the group consisting of heat, pressure, vibration, and light.

<14> The inkjet recording method according to any one of <12> to <13>, wherein, at the time of ejecting the ink, the ink is ejected from a nozzle in the form of droplets, and wherein each of the droplets has a size of 2 pl to 10 pl, a speed of 6 m/s to 20 m/s, a frequency of 1 kHz or more, and a resolution of 300 dpi or more.

<15> An inkjet recording apparatus, comprising: a ink ejecting unit which is configured to apply a stimulus to the ink for recording according to any one of claims 1 to 10 so as to eject the ink, and to form an image.

<16> The inkjet recording apparatus according to <15>, wherein the stimulus is at least one selected from the group consisting of heat, pressure, vibration and light.

<17> The inkjet recording apparatus according to any of <15> to <16>, further containing an ink cartridge containing a container, and the ink housed in the container, wherein the ink ejecting unit contains a nozzle head, and a subtank disposed above the nozzle head, wherein the subtank is supplied with the ink from the ink cartridge via a supply tube.

<18> An ink recorded matter, containing a recording medium; and an image formed on the recording medium with the ink for recording according to any one of <1> to <10>.

<19> The ink recorded matter according to <18>, wherein the recording medium has a Stockigt size degree of 3 seconds or more.

The ink for recording of the present invention contains at least the coloring agent, the water-dispersible resin, the wetting agent, the surfactant and the water, and the lettering quality of the ink is enhanced by making the total solid content of the coloring agent and the water-dispersible resin be in the range of 10% by mass to 30% by mass with respect to the total mass of the ink. The enhancement of the fixing property and the improvement of the coloring property are also obtained by making the ratio B/C be in the range of 0.1 to 1.6, where B is the solid content of the coloring agent, and C is the solid content of the water-dispersible resin.

In the ink for recording of the present invention, the effects of enhancing the printing density and the lettering quality are obtained by making the viscosity be 5 mPa·s or more at 25° C., and the ejecting property thereof can be assured by reducing the viscosity to 20 mPa·s or less at 25° C.

In the ink for recording of the present invention, the sufficient permeability can be obtained even in the ink with high viscosity as the above by making the surface tension be 35 mN/m or less. Thus, a high drying speed can be obtained. Preferably, by using the fluorine surfactant, the drying speed is further enhanced, and even in the ink with high viscosity, the drying property which is not different from that in the ink with low viscosity is obtained.

In the ink for recording of the present invention, a water evaporation speed is slowed down and ejecting reliability of the ink is enhanced by preferably using, as the wetting agent, polyhydric alcohol having the equilibrium moisture content of 25% by mass or more under the condition of 20° C. and 60% RH. In this case, the printing density is enhanced and the strike-through is reduced by using glycerin as the polyhydric alcohol and making the content of the glycerin be 50% by mass or less with respect to the entire wetting agent.

The ink cartridge of the present invention contains the container and houses the ink of the present invention in the container. The ink cartridge is suitably used for printers and the like of the inkjet recording system. When recording is performed by using the ink housed in the ink cartridge, chroma of the recorded image is remarkably enhanced, and the image formation of excellent coloring property, high ejecting stability and high image quality can be performed.

The inkjet recording apparatus of the present invention contains the ink ejecting unit which is configured to apply a stimulus, e.g. energy, to the ink of the present invention so as to eject the ink to form the image. In the inkjet recording apparatus, the ink ejecting unit applies the stimulus, e.g. energy, to the ink of the present invention, and ejects the ink to form the image. As a result, it becomes possible to perform the image recording where the image quality, drying speed and high speed printing capability are excellent for the plain paper, the ejecting stability from the nozzle is good, the image quality of high quality and high density close to that in an electrophotographic system is obtained, and the drying property is high.

The inkjet recording method of the present invention contains at least to apply a stimulus, e.g. energy, to the ink of the present invention so as to eject the ink, and to form an image. In the inkjet recording method, in the above ink ejecting step, the stimulus, e.g. energy, is applied to the ink of the present invention, and the image is formed by ejecting the ink for recording. As a result, it becomes possible to perform the image recording where the image quality, drying speed and high speed printing capability are excellent for the plain paper, the ejecting stability from the nozzle is good, the image quality of high quality and high density close to that in the electrophotographic system is obtained, and the drying property is high.

The ink recorded matter of the present invention contains the recording medium, and the image formed on the recording medium using the ink of the present invention. In the ink recorded matter, the image with high quality where the chroma is remarkably enhanced and the coloring property is excellent is retained on the recording medium.

Figure 1:
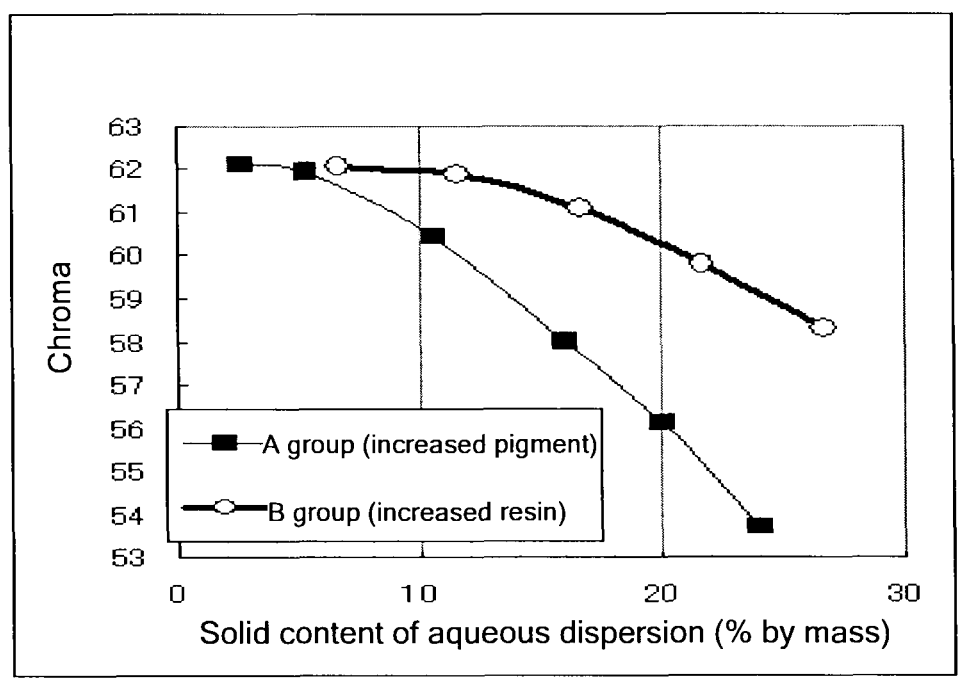
FIG. 1 is a graph showing a relationship between chroma and the solid content of the ink in Experiment 1.

BEST MODES FOR CARRYING OUT THE INVENTION (Ink for Recording)

The ink for recording of the present invention contains at least a coloring agent, a water-dispersible resin, a wetting agent, a surfactant, and water, and optionally contains other components, if necessary.

In the present invention, by increasing the total solid content of the coloring agent and the water-dispersible resin contained in the ink for recording, rapid increase of the viscosity is given in a drying process after the ink is ejected on a surface of the paper, and the solid content of a color material is abundantly retained on the paper surface to enhance the image density and the color forming property and suppress the show through. Therefore, the total content of the coloring agent and the water-dispersible resin is 10% by mass to 30% by mass, and preferably 15% by mass to 25% by mass with respect to the total mass of the ink. When the solid content of the coloring agent and the water-dispersible resin is less than 10% by mass, the solid content can not be abundantly retained on the recording medium and the image density and the color forming property are deteriorated in some cases. When it is more than 30% by mass, wrong ejecting easily occurs because the drying property at the nozzle surface becomes high.

When compared with the same amount of the coloring agent, if only a concentration of the coloring agent is increased, the composites, e.g. particles, forming the coloring agent are strongly aggregated with each other after the ink is fixed on a surface of paper by means of the inkjet system, and thus the hue of the image is largely changed. The more the ratio of the water insoluble resin relative to the coloring agent is, the aggregation among the composites of the coloring agent is suppressed and the coloring property is enhanced. The more the ratio of the water insoluble resin relative to the coloring agent is, the fixing property of the coloring agent onto the paper is also enhanced. Therefore, the ratio B/C is 0.1 to 1.6, preferably 0.1 to 1.3 and more preferably 0.3 to 1.0, where B is the solid content of the coloring agent, and C is the solid content of the water-dispersible resin. When the ratio B/C is less than 0.1, the sufficient coloring property is not sometimes obtained. When it is more than 1.6, the fixing property of the coloring agent is inferior and the aggregation between the composites of the coloring agent upon drying after recording, is not sometimes suppressed.

Here, the solid content of the coloring agent and the water-dispersible resin can be measured, for example, by separating only the coloring agent and the water-dispersible resin from the ink. As a separation method, for example, the solid content is precipitated by centrifuging the ink at 500,000 G or more for 24 hours, and it becomes possible to separate the solid from the liquid. It is also possible to separate the solid from the liquid by salting out or aggregation by a solvent depending on types of the coloring agent and the water-dispersible resin. The separated solid is thoroughly dried to use for the measurement.

When the pigment is used as the coloring agent, the ratio of the coloring agent and the water-dispersible resin can be measured by evaluating a mass reduction rate by thermal mass spectrometry. Upon the measurement, to inhibit the combustion of the resin and the pigment, the temperature is raised up to 500° C. at 10° C./minute in an inert gas atmosphere, and the mass change is measured. Since the solid after the solid-liquid separation slightly contains the water and the wetting agent component, the mass at 200° C. at which the aforementioned components are almost lost is made a total solid mass, and the mass at 500° C. at which most resin components are thermally decomposed and volatilized is made the mass of the pigment. The ratio of the pigment and the resin can be calculated from the pigment mass/(total solid mass−pigment mass).

When the heat resistance of the pigment such as parts of azo pigments is low, the pigment is thermally decomposed up to 500° C., and it is difficult to measure the pigment mass. However, it is possible to calculate the pigment mass by dissolving the resin in the solvent and extracting the solid with solvent. By calculating the ratio of the pigment in the solid from the mass before and after the extraction, and calculating the total solid mass from the above thermal mass spectrometry, the solid mass of the pigment can be calculated as the sample mass×pigment ratio.

When a molecular structure of the coloring agent has been demonstrated, it is possible to quantify the solid amount of the coloring agent by using NMR for the pigment and the dye or using fluorescence X ray analysis for inorganic pigments contained in heavy metal atoms and molecular skeletons, gold containing organic pigments and gold containing dyes.

The viscosity of the ink is 5 mPa·s to 20 mPa·s, and preferably 10 mPa·s to 20 mPa·s at 25° C. When the viscosity is less than 5 mPa·s at 25° C., the feathering and the bleeding can not be suppressed in some cases. When it is more than 20 mPa·s, the ejecting property from the nozzle is deteriorated.

Here, the viscosity can be measured by means of a viscometer (RL-500 supplied from Toki Sangyo Co., Ltd.) at 25° C.

The surface tension of the ink is 35 mN/m or less, preferably 30 mN/m or less. The surface tension of the ink is also preferably 15 mN/m or more, and more preferably 20 mN/m or more. When the surface tension is more than 35 mN/m, the bleeding between adjacent colors easily occurs, and the permeability into the paper becomes slow and the drying becomes slow. When the surface tension is too low, wetting of the ink onto the head nozzle surface becomes too strong, meniscus formation is unstabilized and the ejection failure is caused.

Here, the surface tension can be measured, for example, by using a full automatic surface tension meter (CBVP-Z supplied from Kyowa Interface Science Co., Ltd.).

As long as the ink for recording of the present invention comprises the properties of the solid content of the coloring agent and the water-dispersible resin, the ratio B/C of the solid content B of the coloring agent to the solid content C of the water-dispersible resin, the viscosity, and the surface tension, the components thereof are not particularly limited, and can be appropriately selected depending on the object. Note, however, that the ink for recording contains at least the coloring agent, the water-dispersible resin, the wetting agent, the surfactant and the water, and if necessary, optionally contains other components.

—Coloring Agent—

As the coloring agent, it is water-dispersible, and a water-dispersible coloring agent including the pigment is suitable. The water-dispersible coloring agent includes (1) a pigment which has at least one hydrophilic group on the surface thereof and exhibit water dispersibility and/or water solubility in the absence of a dispersant, (2) polymer emulsion which contains polymer particles each containing a water insoluble material and/or a material having poor water solubility, and (3) a pigment dispersed in either a surfactant or a water soluble macromolecular compound having a weight average molecular weight of 50,000 or less.

Describing by limiting to the pigments, the water-dispersible coloring agents of the above (1) to (3) are as follows.

The above (1) is generally referred to as a self dispersible pigment, and is obtained by making mainly carbon black be hydrophilic by surface oxidation and dispersing the pigment alone in water.

The above (2) is generally referred to as a capsule pigment, and is obtained by covering the pigment with the hydrophilic water insoluble resin and making hydrophilic by a resin layer on the pigment surface to disperse the pigment in water.

The above (3) is generally referred to as a surfactant dispersion pigment or a resin dispersion pigment, and the pigment is dispersed by interacting the interface between the pigment and the water with the compound having an interface active ability (herein surfactants and water soluble macromolecular compounds). The difference between (3) and (2) is whether the resin is dissolved in the water or not, which affects the solvent resistance and the color forming property of the pigment dispersion body.

In such a water-dispersible coloring agent, color material molecules are in an aggregate form (including a crystal form) or coexist with resin molecules, and are not present as a single molecule. Thus, the coloring agent is excellent in water resistance, light resistance and gas resistance. By using such a coloring agent, it becomes possible to enhance the image storage stability. In particular, when using the pigment which is dispersible in water using no dispersant by binding at least one hydrophilic group to the pigment surface directly or via another atomic group, or the polymer emulsion containing the water insoluble or water hardly soluble color material in the resin fine particles, it becomes possible to abundantly add the water insoluble resin and the wetting agent because the ink viscosity for the coloring agent solid content can be reduced low.

In the above (1), the surface is modified so that at least one hydrophilic group is bound to the surface of the pigment directly or via another atomic group. Therefor, a certain functional group (functional group such as sulfone or carboxyl group) is chemically bound to the surface of the pigment, or a wet oxidation treatment is given to the surface using at least any of hypohalogen acid and salts thereof. Among them, it is preferable that the carboxyl group is bound to the surface of the pigment and the pigment is dispersed in water. Since the surface is modified and the carboxyl group is bound, not only the dispersion stability is enhanced but also the high printing quality is obtained as well as the water resistance of the recording medium after printing is enhanced.

Since the ink in this form is excellent in redispersibility after drying, even when the printing is discontinued for a long time and ink moisture around the nozzle of the inkjet head is evaporated, no clogging occurs and the good printing can be easily performed by simple cleaning. When the self dispersible pigment is combined with the surfactant and a permeating agent described later, their synergistic effect is particularly large and it becomes possible to obtain the more reliable and high quality images.

It is preferable that a volume average particle diameter of the self dispersible pigment is 0.01 μm to 0.16 μm in the ink.

In the above (2), the polymer emulsion containing the color material is at least either one obtained by including the pigment in the polymer fine particle or one obtained by absorbing the pigment on the surface of the polymer fine particle. In this case, it is not necessary that all pigments are included and/or absorbed, and the pigments may be dispersed in the emulsion in the range where the effects of the present invention is not impaired.

Polymers which form the polymer emulsion include, for example, vinyl based polymers, polyester based polymers, polyurethane based polymers, and polymers disclosed in JP-A Nos. 2000-53897 and 2001-139849. Among them, the vinyl based polymer and the polyester based polymer are particularly preferable.

The volume average particle diameter of the polymer fine particles (coloring fine particles) in which the pigment has been contained is preferably 0.01 µm to 0.16 µm in the ink.

In the above (3), the surfactant includes, for example, anionic surfactants such as polyoxyethylene alkyl ether acetate salts, polyoxyethylene alkyl ether phosphate salts, alkyl sulfonate salts, alkyl benzene sulfonate salts, succinate ester sulfonate salts, lauryl acid salts and polyoxyethylene alkyl ether sulfate salts, and nonionic surfactants such as polyoxyethylene alkyl ether, polyoxyethylene naphthyl ether, polyoxyethylene polyoxypropylene alkyl ether, polyoxyethylene alkyl ester, polyoxyethylene polyoxypropylene alkyl ester, polyoxyethylene sorbitan fatty acid ester, polyoxyethylene alkyl phenyl ether, polyoxyethylene alkylamine, and polyoxyethylene alkylamide.

As such surfactants, commercially available products can be used. The commercially available products can be easily obtained from, for example, NOF Corporation, Nikko Chemicals Co., Ltd., Nippon Emulsion Co., Ltd., Nippon Shokubai Co., Ltd., Dai-ichi Kogyo Seiyaku Co., Ltd., Toho Chemical Industry Co., Ltd., Kao Corporation, Adeka Co., Ltd., Lion Corporation, Aoki Oil Industrial Co., Ltd., and Sanyo Chemical Industries, Ltd.

The water soluble macromolecular compound having the weight average molecular weight of 50,000 includes, for example, polyacrylic acid, polymethacrylic acid, acrylic acid-acrylonitrile copolymers, vinyl acetate-acrylate ester copolymers, acrylic acid-acrylate alkyl ester copolymers, styrene-acrylic acid copolymers, styrene-methacrylic acid copolymers, styrene-acrylic acid-acrylate alkyl ester copolymers, styrene-methacrylic acid acrylate alkyl ester copolymers, styrene-α-methylstyrene-acrylic acid copolymers, styrene-α-methylstyrene-acrylic acid copolymers-acrylate alkyl ester copolymers, styrene-maleic acid copolymers, vinyl naphthalene-maleic acid copolymers, vinyl acetate-ethylene copolymers, vinyl acetate-fatty acid vinyl ethylene copolymers, vinyl acetate-maleate ester copolymers, vinyl acetate-crotonic acid copolymers and vinyl acetate-acrylic acid copolymers.

As such a water soluble macromolecular compound, those appropriately synthesized may be used, or commercially available products may be used.

The commercially available products can be easily obtained from Johnson Polymer Co., Ltd., Nagase ChemteX Corporation, Toagosei Co., Ltd., Mitsubishi Rayon Co., Ltd., Sumitomo Seika Chemicals Co., Ltd., JSR, Showa Highpolymer Co., Ltd., Arakawa Chemical Industries Ltd., Nippon Shokubai Co., Ltd., Nippon Synthetic Chemical Industry Co., Ltd., and Kuraray Co., Ltd.

The coloring agent is not particularly limited, and can be appropriately selected depending on the purpose. The pigment is primarily used, and the dye may be contained for the purpose of color tone control within the range in which the weather resistance is not deteriorated.

The pigment is not particularly limited, can be appropriately selected depending on the purpose, and may be any of inorganic pigments and organic pigments.

The inorganic pigments include, for example, titanium oxide, iron oxide, calcium carbonate, barium sulfate, aluminium hydroxide, barium yellow, cadmium red, chromium yellow, and carbon black. Among them, carbon black is preferable. The carbon black includes those produced by the publicly known methods such as a contact method, a furnace method and a thermal method.

The organic pigments include azo pigments, polycyclic pigments, dye chelates, nitro pigments, nitroso pigments, and aniline black. Among them, azo pigments and polycyclic pigments are preferable. The azo pigments include, for example, azo lakes, insoluble azo pigments, condensed azo pigments, and chelate azo pigments. The polycyclic pigments include phthalocyanine pigments, perylene pigments, perinone pigments, anthraquinone pigments, quinacridone pigments, dioxadine pigments, indigoid pigments, thioindigoid pigments, isoindolinone pigments and quinophtalone pigments. The dye chelates include, for example, basic dye chelates and acidic dye chelates.

The color of the coloring agent is not particularly limited, can be appropriately selected depending on the purpose, and includes those for monochrome or color. These may be used alone or in combination of two or more.

Those for the monochrome include, for example carbon black (C.I. pigment black 7) such as furnace black, lamp black, acetylene black and channel black, metals such as copper iron (C.I. pigment black 11) and titanium oxide, organic pigments such as aniline black (C.I. pigment black 1).

Those for the color include, for example, C.I. pigment yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153, 183; C.I. pigment orange 5, 13, 16, 17, 36, 43, 51; C.I. pigment red 1, 2, 3, 5, 17, 22, 23, 31, 38, 48:2, 48:2 (permanent red 2B (Ca)), 48:3, 48:4, 49:1, 52:2, 53:1, 57:1 (brilliant carmine 6B), 60:1, 63:1, 63:2, 64:1, 81, 83, 88, 101 (colcothar), 104, 105, 106, 108 (cadmium red), 112, 114, 122 (quinacridone magenta), 123, 146, 149, 166, 168, 170, 172, 177, 178, 179, 185, 190, 193, 209, 219; C.I. pigment violet (rhodamine lake), 3, 5:1, 16, 19, 23, 38; C.I. pigment blue 1, 2, 15 (phthalocyanine blue) 15:1, 15:2, 15:3 (phthalocyanine blue), 16, 17:1, 56, 60, 63; C.I. pigment green 1, 4, 7, 8, 10, 17, 18, 36.

It is preferable that the pigment for black is carbon black. The carbon black as the black ink is excellent in color tone as well as in water resistance, regressive property and dispersion stability and is inexpensive.

Graft pigments obtained by treating the surface of other pigments (e.g., carbon) with the resin to make dispersible in water and processed pigments obtained by adding the functional group such as sulfone or carboxyl group onto the surface of the pigment (e.g., carbon) to make dispersible in water can be used.

Those obtained by including the pigment in microcapsules to make dispersible in water may be used.

The dye is not particularly limited, can be appropriately selected depending on the purpose, and includes acidic dyes, direct dyes, basic dyes and reactive dyes.

The acidic dyes are not particularly limited, can be appropriately selected depending on the purpose, and include those known as edible dyes. For example, C.I. acid yellow 17, 23, 42, 44, 79, 142, C.I. acid red 1, 8, 13, 14, 18, 26, 27, 35, 37, 42, 52, 82, 87, 89, 92, 97, 106, 111, 114, 115, 134, 186, 249, 254, 289, C.I. acid blue 9, 29, 45, 92, 249; C.I. acid black 1, 2, 7, 24, 26, 94; C.I. food yellow 2, 3, 4, C.I. food red 7, 9, 14; C.I. food black 1, 2 are included.

The direct dyes include, for example, C.I. direct yellow 1, 12, 24, 26, 33, 44, 50, 120, 132, 142, 144, 86; C.I. direct red 1, 4, 9, 13, 17, 20, 28, 31, 39, 80, 81, 83, 89, 225, 227; C.I. direct orange 26, 29, 62, 102; C.I. direct blue 1, 2, 6, 15, 22, 25, 71, 76, 79, 86, 87, 90, 98, 163, 165, 199, 202; C.I. direct black 19, 22, 32, 38, 51, 56, 71, 74, 75, 77, 154, 168, 171.

The basic dyes include, for example C.I. basic yellow 1, 2, 11, 13, 14, 15, 19, 21, 23, 24, 25, 28, 29, 32, 36, 40, 41, 45, 49, 51, 53, 63, 465, 67, 70, 73, 77, 87, 91; C.I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C.I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; C.I. basic black 2, 8.

The reactive dyes include, for example, C.I. reactive black 3, 4, 7, 11, 12, 17; C.I. reactive yellow 1, 5, 11, 13, 14, 20, 21, 22, 25, 40, 47, 51, 55, 65, 67; C.I. reactive red 1, 14, 17, 25, 26, 32, 37, 44, 46, 55, 60, 66, 74, 79, 96, 97; C.I. reactive blue 1, 2, 7, 14, 15, 23, 32, 35, 38, 41, 63, 80, 95.

Among these dyes, the acidic dye and the direct dye can be preferably used.

The content of the coloring agent in the ink for recording is not particularly limited, can be appropriately selected depending on the purpose, and is preferably 5% by mass or more and more preferably 5% by mass to 15% by mass. When the content is less than 5% by mass, the image density is thin and the image with no contrast is sometimes made. When it is more than 15% by mass, it is difficult to assure the dispersion stability of the coloring agent, the nozzle clogging easily occurs and the reliability worsens sometimes.

—Wetting Agent—

The wetting agent is not particularly limited, can be appropriately selected depending on the purpose, and includes, for example, glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. These may be used alone or in combination of two or more.

Among them, polyhydric alcohol having an equilibrium moisture content of 25% by mass or more under the condition of 20° C. and 60% RH is preferable in terms of obtaining the effects to slow down the water evaporation speed of the ink and enhance the ejecting reliability of the ink. Among the polyhydric alcohols, glycerin is particularly preferable in terms of having the effects to suppress the aggregation of the coloring agent and prevent the growth of particle diameters although the viscosity is rapidly increased as the water is evaporated.

It is preferable that one of the polyhydric alcohols is glycerin and the content of the glycerin is 50% by mass or less relative to the total amount of the wetting agent.

The wetting agent combined with glycerin is preferably 1,3-butanediol. The 1,3-butanediol has high equilibrium moisture content and high reliability similarly to glycerin, and the high effects to uniform the spread of pixels when the ink is jetted and to further retain the color material on the paper surface. Although glycerin has the high reliability enhancing effect, when the large amount thereof is added, the image quality worsens, the viscosity is excessively increased after evaporating the water, and the ejecting stability worsens in some cases. Therefore, their mixture mass ratio is preferably 1:5 to 5:1 and more preferably 1:1 to 4:1.

The content of the wetting agent in the ink for recording is preferably 10% by mass to 50% by mass and more preferably 20% by mass to 35% by mass. When the content is low, the storage stability and the ejecting stability of the ink worsen and the nozzle clogging easily occurs. When the content of the wetting agent is too high, the drying property worsens, and the bleeding of letters and color borders occurs to reduce the image quality.

—Surfactant—

The surfactant is not particularly limited, and can be appropriately selected from surfactants which do not impair the dispersion stability depending on the type of the coloring agent and the combination of the wetting agent and the water soluble organic solvent, depending on the purpose. The ink has the high solid content as the above, and thus to permeate the ink with high viscosity into the paper, the permeability is insufficient in the surfactant having only carbon chains in the hydrophobic group. Thus, at least one selected from the silicone based surfactants and the fluorine based surfactants is suitable. Among them, the fluorine based surfactant is particularly preferable.

The fluorine based surfactant includes, for example, perfluoroalkyl sulfonate compounds, perfluoroalkyl carboxylate compounds, perfluoroalkyl phosphate ester compounds, perfluoroalkyl ethylene oxide adducts, and polyoxyalkylene ether polymer compounds having perfluoroalkyl ether group in the side chain. Among them, the polyoxyalkylene ether polymer compounds having perfluoroalkyl ether group in the side chain is particularly preferable because foaming ability is low, accumulation of the fluorine compound in the body which has been recently seen as a problem is low and thus safety is high.

The perfluoroalkyl sulfonate compounds include, for example, perfluoroalkyl sulfonic acid and perfluoroalkyl sulfonate salts.

The perfluoroalkyl carboxylate compounds include, for example perfluoroalkyl carboxylic acid and perfluoroalkyl carboxylate salts.

The perfluoroalkyl phosphate ester compounds include, for example perfluoroalkyl phosphate ester and perfluoroalkyl phosphate ester salts.

The polyoxyalkylene ether polymer compounds having the perfluoroalkyl ether group in the side chain include, for example polyoxyalkylene ether polymer having perfluoroalkyl ether group in the side chain, sulfate ester salts of polyoxyalkylene ether polymer having perfluoroalkyl ester group in the side chain and salts of polyoxyalkylene ether polymer having perfluoroalkyl ether group in the side chain.

Counterions of the salts in these fluorine based surfactants include Li, Na, K, $NH_4$, $NH_3CH_2CH_2OH$, $NH_2(CH_2CH_2OH)_2$, and $NH(CH_2CH_2OH)_3$.

As the fluorine based surfactants, those appropriately synthesized may be used, or commercially available products may be used.

The commercially available products include Surflon S-111, S-112, S-113, S-121, S-131, S-132, S-141, S-145 (supplied from Asahi Glass Co., Ltd.), Fullard FC-93, FC-95, FC-98, FC-129, FC-135, FC-170C, FC-430, FC-431 (supplied from Sumitomo 3M Ltd.), Megafac F-470, F1405, F-474 (Dainippon Ink And Chemicals, Incorporated), Zonyl TBS, FSP, FSA, FSN-100, FSN, FSO-100, FSO, FS-300, UR (supplied from DuPont), FT-110, FT-250, FT-251, FT-400S, FT-150, FT-400SW (Neos Corporation) and PF-151N (Omnova Inc.). Among them, FT-110, FT-250, FT-251, FT-400S, FT-150, FT-400SW supplied from Neos Corporation and PF-151N supplied from Omnova Inc. are particularly preferable in terms of good printing quality, particularly remarkably enhancing the color forming property and the evenly staining property for the paper.

Specific examples of the fluorine based surfactant are preferably those represented by the following general formulae.

(1) Anionic Fluorine Based Surfactant

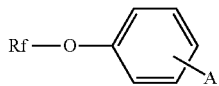

In the above general formula, Rf represents a mixture of fluorine containing hydrophobic groups represented by the following structural formulae, and A represents —SO$_3$X, —COOX or —PO$_3$X (but X is counteranion, specifically includes hydrogen atom, Li, Na, K, NH$_4$, NH$_3$CH$_2$CH$_2$OH, NH$_2$(CH$_2$CH$_2$OH)$_2$, or NH(CH$_2$CH$_2$OH)$_3$).

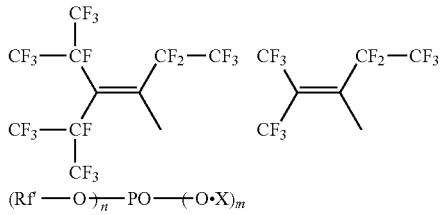

But, in the above general formula, Rf' represents a fluorine containing group represented by the following structural formula. X is the same defined as the above, n represents an integer of 1 or 2, and m represents 2-n.

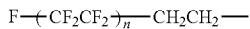

But, n represents an integer of 3 to 10.

In the above general formula, Rf and X are the same as defined above.

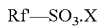

In the above general formula, Rf and X are the same as defined above.

(2) Nonionic Fluorine Based Surfactant

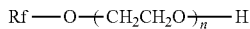

In the above general formula, Rf is the same as defined above, and n represents an integer of 5 to 20.

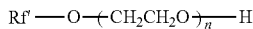

In the above general formula, Rf' is the same as defined above, and n represents an integer of 1 to 40.

(3) Ampholytic Fluorine Based Surfactant

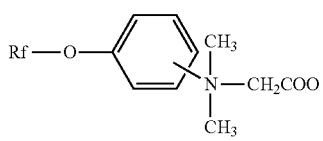

In the above general formula, Rf is the same as defined above (4) Oligomer Type Fluorine Based Surfactant

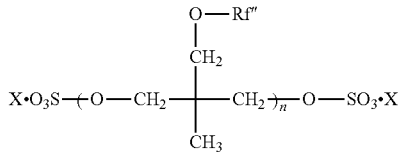

In the above general formula, Rf'' represents the fluorine containing group represented by the following structural formula, n represents an integer of 0 to 10, and X is the same as defined above.

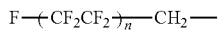

But, n represents an integer of 1 to 4.

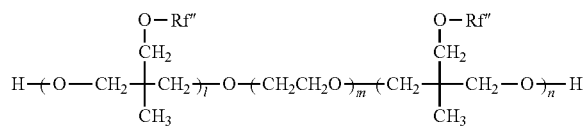

Rf' is the same as defined above, l, m, and n represent integers of 0 to 10.

The silicone based surfactant is not particularly limited, can be appropriately selected depending on the purpose, and includes, for example, polydimethylsiloxane with modified side chain, polydimethylsiloxane with modified both ends, polydimethylsiloxane with modified one end and polydimethylsiloxane with modified side chain and both ends. As a modifying group, those having polyoxyethylene group or polyoxyethylene polyoxypropylene group are particularly preferable because they exhibit good natures as aqueous surfactants.

As such a surfactant, those appropriately synthesized may be used, or commercially available products may be used.

The commercially available products can be easily obtained from, for example, BYK Chemie GmbH, Shin-Etsu Silicones Co., Ltd., and Dow Corning Tray Co., Ltd.

The anionic surfactant, the nonionic surfactant, the ampholytic surfactant and the acetylene glycol based surfactant can be used in addition to the above fluorine based surfactant and silicone based surfactant.

The anionic surfactant includes, for example, polyoxyethylene alkyl ether acetate salts, dodecyl benzene sulfonate salts, succinate ester sulfonate salts, lauryl acid salts and salts of polyoxyethylene alkyl ether sulfate.

The nonionic surfactant includes, for example, polyoxyethylene alkyl ether, polyoxyethylene polyoxypropylene alkyl ether, polyoxyethylene alkyl ester, polyoxyethylene polyoxypropylene alkyl ester, polyoxyethylene sorbitan fatty acid ester, polyoxyethylene alkyl phenyl ether, polyoxyethylene alkylamine and polyoxyethylene alkylamide.

The ampholytic surfactant includes, for example, lauryl aminopropionate salts, lauryl dimethylbetaine, stearyl dimethylbetaine, lauryl hydroxyethylbetaine, lauryl dimethylamine oxide, myristyl dimethylamine oxide, stearyl dimethylamine oxide, dihydroxyethyllaurylamine oxide, polyoxyethylene palm oil alkyl dimethylamine oxide, dimethylalkyl (palm) betaine, and dimethyllauryl betaine.

As such a surfactant, the commercially available products can be easily obtained from Nikko Chemicals Co., Ltd., Nippon Emulsion Co., Ltd., Nippon Shokubai Co., Ltd., Toho Chemical Industry Co., Ltd., Kao Corporation, Adeka Co., Ltd., Lion Corporation, Aoki Oil Industrial Co., Ltd., and Sanyo Chemical Industries, Ltd.

The acetylene glycol based surfactant includes, for example, 2,4,7,9-tetramethyl-5-decine-4,7-diol, 3,6-dimethyl-4-octine-3,6-diol and 3,5-dimethyl-1-hexine-3-ol. The acetylene glycol based surfactant includes Surfynol 104, 82, 465, 485, and TG supplied from Air Products (USA) as the commercially available products.

The surfactants are not limited thereto, and may be used alone or in mixture of two or more. When a single surfactant is not easily dissolved in the recording liquid, the surfactant can be solubilized to be present stably by mixing with another surfactant.

Among these surfactants, the nonionic surfactants represented by the following structural formulae 1-5 are suitable.

Structural Formula 1

In the structural formula 1, $R^1$ represents a branched or unbranched C6-14 alkyl group, or a branched or unbranched C6-14 perfluoroalkyl group; $R^2$ represents a hydrogen atom or a branched or unbranched C1-4 alkyl group; and h represents an integer of 5 to 20.

Structural Formula 2

In the structural formula 2, $R^1$ represents a branched or unbranched C6-14 alkyl group; $R^2$ represents a hydrogen atom or a branched or unbranched C1-4 alkyl group; and h represents an integer of 5 to 20.

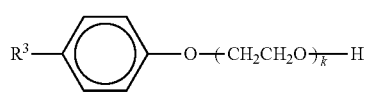
Structural Formula 3

In the structural formula 3, $R^3$ represents a hydrocarbon group and, for example, includes a branched or unbranched C6-14 alkyl group; and k represents an integer of 5 to 20.

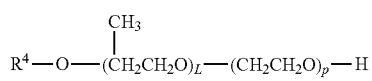
Structural Formula 4

In the structural formula 4, $R^4$ represents a hydrocarbon group and for example represents a branched or unbranched C6-14 alkyl group; L represents an integer of 5 to 10; and p represents an integer of 5 to 20. A propylene glycol chain and an ethylene glycol chain may undergo the block polymerization or the random polymerization.

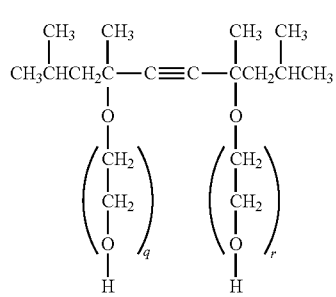
Structural Formula 5

In the structural formula 5, q and p represent integers of 5 to 20.

The content of the surfactant in the ink for recording is preferably 0.01% by mass to 5.0% by mass and more preferably 0.5% by mass to 2% by mass. When the content is less than 0.01% by mass, the effect of the added surfactant is lost in some cases. When it exceeds 5.0% by mass, the permeability into the recording medium becomes unnecessarily high, and the reduction of image density or the show through occur in some cases.

—Water-Dispersible Resin—

The water-dispersible resin is not particularly limited, can be appropriately selected depending on the purpose, and includes condensed synthetic resins, addition synthetic resins and natural macromolecular compounds.

The condensed synthetic resins include, for example, polyester resins, polyurethane resins, polyepoxy resins, polyamide resins, polyether resins and silicone resins. The addition synthetic resins include, for example, polyolefin resins, polystyrene based resins, polyvinyl alcohol based resins, polyvinyl ester based resins, polyacrylic resins, and unsaturated carboxylic acid based resins. The natural macromolecular compounds include, for example, celluloses, rosins and natural rubbers.

The water-dispersible resin may be used as a homopolymer or as a composite resin as a copolymer. Any of a single phase type and a core shell type, a power feed type and an emulsion can be used.

As the water-dispersible resin, those where the resin itself has the hydrophilic group and the self dispersibility and those where the resin itself has no dispersibility and the dispersibility has been imparted by the surfactant or the resin having the hydrophilic group can be used. Among them, ionomers of the polyester resin and polyurethane resin, and emulsions of resin particles obtained by emulsification and suspension polymerization of an unsaturated monomer are optimal. In the case of emulsification polymerization of the unsaturated monomer, the water-dispersible resin can be easily obtained because the resin emulsion is obtained by reacting in the water into which the unsaturated monomer, a polymerization initiator, and a surfactant, a chain transfer agent, a chelator and a pH adjuster have been added, and objective natures are easily made because the resin constitution is easily changed.

As the unsaturated monomer, for example, unsaturated carboxylic acids, (meth)acrylate ester monomers, (meth)acrylate amide monomers, aromatic vinyl monomers, vinyl cyan compound monomers, vinyl monomers, allyl compound monomers, olefin monomers, diene monomers, oligomers having unsaturated carbons can be used alone or in combination of two or more. By combining these monomers, it is possible to flexibly modify the natures. By performing the polymerization reaction and the graft reaction using an oligomer type polymerization initiator, it is also possible to modify the property of the resin.

The unsaturated carboxylic acids include, for example, acrylic acid, methacrylic acid, itaconic acid, fumaric acid and maleic acid.

The monofunctional (meth)acrylate esters include, for example, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salts, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyltrimethyl ammonium salts.

The multifunctional (meth)acrylate esters include, for example, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane trimethylol propane triacrylate, trimethylol ethane triacrylate, tetramethylol methane triacrylate, ditrimethylol tetraacrylate, tetramethylol methane tetraacrylate, pentaerythritol tetraacrylate, and dipentaerythritol hexaacrylate.

The (meth)acrylate amide monomers include, for example, acrylamide, methacrylamide, N,N-dimethylacrylamide, methylenebisacrylamide, and 2-acrylamide-2-methylpropane sulfonate.

The aromatic vinyl monomers include, for example, styrene, α-methylstyrene, vinyl toluene, 4-t-butylstyrene, chlorostyrene, vinyl anisole, vinyl naphthalene and divinyl benzene.

The vinyl cyan compound monomers include, for example, acrylonitrile and methacrylonitrile.

The allyl compound monomers include, for example, allyl sulfonic acid and salts thereof, allylamine, allyl chloride, diallylamine, and diallyldimethyl ammonium salts.

The olefin monomers include, for example, ethylene and propylene.

The diene monomers include, for example, butadiene and chloroprene.

The vinyl monomers include, for example, vinyl acetate, vinylidene chloride, vinyl chloride, vinyl ether, vinyl ketone, vinyl pyrrolidone, vinyl sulfonic acid and salts thereof, vinyl trimethoxysilane and vinyl triethoxysilane.

The oligomers having unsaturated carbons include, for example, styrene oligomers having methacryloyl group, styrene-acrylonitrile oligomers having methacryloyl group, methyl methacrylate oligomers having methacryloyl group, dimethylsiloxane oligomers having methacryloyl group and polyester oligomers having acryloyl group.

In the water-dispersible resin, molecular chains are disrupted by dispersion destruction and hydrolysis under the highly alkaline or acidic condition. Thus pH thereof is preferably 4 to 12, preferably 6 to 11, and more preferably 7 to 9, particularly in terms of miscibility with the water-dispersible coloring agent.

The particle diameter of the water-dispersible resin is associated with the viscosity of a dispersion liquid, and in the same composition, the smaller the particle diameter is, the larger the viscosity in the same solid content becomes. Not to make the viscosity excessively high when the ink is made, the average particle diameter of the water-dispersible resin is preferably 50 nm or more. When the particle diameter is several tens μm, the particle can not be used because it is larger than a nozzle orifice of the inkjet head. It has been know that even if the particle diameter is smaller than the nozzle orifice, the presence of the particles with large particle diameter in the ink makes the ejecting property deteriorate. Thus, not to inhibit the ejecting property, the average particle diameter is preferably 500 nm or less and more preferably 150 nm or less.

The water-dispersible resin works to fix the water-dispersible coloring agent onto the paper surface, and preferably makes a film at ambient temperature to enhance the fixing property of the coloring agent. Thus, the lowest making film temperature (MFT) of the water-dispersible resin is the ambient temperature or below and more preferably 20° C. or below When the glass transfer temperature of the water-dispersible resin is −40° C. or below, a viscous property of the resin film becomes strong and causes tack on printed matters. Thus, it is preferable to use the water-dispersible resin whose glass transfer temperature is −30° C. or above.

The content of the water-dispersible resin in the ink for recording is preferably 4% by mass to 27% by mass and more preferably 8% by mass to 20% by mass in terms of solid content.

—Permeating Agent—

As the permeating agent, it is preferable to contain at least one polyol compound whose solubility in water at 20° C. is 0.2% to 5.0% by mass. Such a polyol compound include aliphatic diol such as 2-ethyl-2-methyl-1,3-peopanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol and 2-ethyl-1,3-hexanediol.

Among them, 2-ethyl-1,3-hexanediol and 2,2,4-trimethyl-1,3-pentanediol are particularly preferable.

The other permeating agents capable of being combined are not particularly limited as long as they are dissolved in the ink and can be adjusted to the desired physical property, can be appropriately selected depending on the purpose, and include, for example, alkyl and allyl ethers of polyhydric alcohols such as ethylene glycol monophenyl ether, ethylene glycol monoallyl ether, diethylene glycol monophenyl ether, diethylene glycol monobutyl ether, propylene glycol monobutyl ether and tetraethylene glycol chlorophenyl ether, and lower alcohols such as ethanol.

The content of the permeating agent in the ink is preferably 0.1% by mass to 4.0% by mass. When the content is less than 0.1% by mass, a quick-drying property is not obtained to make the image with bleeding in some cases. When it is more than 4.0% by mass, the dispersion stability of the coloring agent is impaired, the nozzle clogging easily occurs, the permeability into the recording medium becomes unnecessarily high, and the reduction of image density and the show through occur in some cases.

The other components are not particularly limited, can be appropriately selected depending on the purpose, and include, for example, pH adjusters, antiseptic and anti-fungal agents, chelating reagents, antirust agents, antioxidants, ultraviolet ray absorbers, oxygen absorbers and light stabilizers.

The pH adjusters are not particularly limited as long as they give no adverse effect on the formulated ink for recording and can adjust pH to the desired value, can be appropriately selected depending on the purpose, and include, for example, alcohol amines, alkali metal hydroxides, ammonium hydroxides, phosphonium hydroxides and alkali metal carbonate salts.

The alcohol amines include, for example, diethanol amine, triethanol amine, and 2-amino-2-ethyl-1,3-propanediol.

The hydroxides of alkali metal elements include, for example, lithium hydroxide, sodium hydroxide and potassium hydroxide.

The ammonium hydroxides include, for example, ammonium hydroxide, quaternary ammonium hydroxide and quaternary phosphonium hydroxide.

The carbonate salts of alkali metals include, for example, lithium carbonate, sodium carbonate and potassium carbonate.

The antiseptic and anti-fungal agents include, for example, sodium dehydroacetate, sodium sorbate, sodium 2-pyridinethiol-1-oxide, sodium benzoate, and sodium pentachlorophenol.

The chelating reagents include, for example, sodium ethylenediamine tetraacetate, sodium nitrilotriacetate, sodium hydroxyethyl ethylenediamine triacetate, sodium diethylenetriamine pentaacetate and sodium uramil diacetate.

The antirust agents include, for example, acidic sulfite salts, sodium thiosulfate, thiodiglycolic acid ammonium, diisopropylammonium nitrate, pentaerythritol tetranitrate, and dicyclohexylammonium nitrate.

The antioxidants include, for example, phenol based antioxidants (including hindered phenol based antioxidants), amine based antioxidants, sulfur based antioxidants, and phosphorus based antioxidants.

The phenol based antioxidants (including hindered phenol based antioxidants) include, for example, butylated hydroxyanisole, 2,6-di-tert-butyl-4-ethylphenol, stearyl-β-(3,5-di-tert-butyl-hydroxyphenyl)propionate, 2,2'-methylene bis(4-methyl-6-tert-butylphenol), 2,2'-methylene bis(4-ethyl-6-tert-butylphenol), 4,4'-butylidene bis(3-methyl-6-tert-butylphenol), 3,9-bis[1,1-dimethyl-2-[β-(3-tert-butyl-4-hydroxy-5-methyphenyl)propionyloxy]ethyl]-2,4,8,10-tetraixaspiro[5.5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetraxis[metyylene-3-(3',5'-di-tert-butyl-4'-hydroxyphenyl) propionate]methane.

The amine based antioxidants include, for example, phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-5-tert-butyl-phenol, butyl hydroxyanisole, 2,2'-methylene bis(4-methyl-6-tert-butylphenol), 4,4'-butylidene bis(3-methyl-6-tert-butylphenol), 4,4'-thiobis(3-methyl-6-tert-butylphenol), tetraxis[methylene-3-(3,5-di-tert-butyl-4-dihydroxyphenyl)propionate]methane and 1,1,3-tris(2-methyl-4-hydroxy-5-tert-butylphenyl)butane.

The sulfur based antioxidants include, for example, dilauryl 3,3'-thiodipropionate, distearyl thiodipropionate, lauryl stearyl thiodipropionate, dimyristyl 3,3'-thiodipropionate, distearyl β,β'-thiodipropionate, 2-mercaptobenzimidazole, and dilauryl sulfide.

The phosphorous based antioxidants include triphenyl phosphite, octadecyl phosphite, triisodecyl phosphite, trilauryl trithiophosphite, and trinonylphenyl phosphite.

The ultraviolet ray absorbers include, for example, benzophenone based ultraviolet ray absorbers, benzotriazole based ultraviolet ray absorbers, salicylate based ultraviolet ray absorbers, cyanoacrylate based ultraviolet ray absorbers, and nickel complex salt based ultraviolet ray absorbers.

The benzophenone based ultraviolet ray absorbers include, for example, 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

The benzotriazole based ultraviolet ray absorbers include, for example, 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

The salicylate based ultraviolet ray absorbers include, for example, phenyl salicylate, p-tert-butylphenyl salicylate, and p-octylphenyl salicylate.

The cyanoacrylate based ultraviolet ray absorbers include, for example, ethyl-2-cyano-3,3'-diphenyl acrylate, methyl-2-cyano-3-methyl-3-(p-methoxyphenyl) acrylate, and butyl-2-cyano-3-methyl-3-(p-methoxyphenyl)acrylate, The nickel complex salt based ultraviolet ray absorbers include, for example, nickel bis(octylphenyl)sulfide, 2,2'-thiobis(4-tert-octylphelate)-n-butylamine nickel (II), 2,2'-thiobis(4-tert-octylphelate)-2-ethylhexylamine nickel (II) and 2,2'-thiobis(4-tert-octylphelate) triethanolamine nickel (II).

The ink for recording of the present invention contains at least the color material particles obtained by covering inorganic pigment particles with either the organic pigment or carbon black, the dispersant represented by at least either the above structural formula 1 or 2, the fluorine based surfactant, the water soluble solvent and water, and is produced by dispersing or dissolving the polymer particles, the pH adjuster and if necessary the other components in the aqueous vehicle, and mixing with stirring as needed. The dispersion can be performed using a sand mill, a homogenizer, a ball mill, a paint shaker and an ultrasonic dispersing machine. The mixing with stirring can be performed using a usual stirrer using a stirring wing, a magnetic stirrer and a high speed dispersing machine.

In the present invention, pH of the ink for recording is not particularly limited, can be appropriately selected depending on the purpose, and is preferably pH 7 to 11. When the pH is too low, it is highly likely to dissolve the metallic members such as a head to which the ink contacts. When it is too high, it is highly likely to dissolve the glass members and the resin members. When the metallic member is used, the member is easily dissolved slowly in the weakly acidic region, and the problem easily occurs in the long term. Therefore, the weakly alkaline region is preferable. In addition, since many of the dyes and the pigments are anionic, there is a merit that they are stably dissolved or dispersed in the alkaline region where the ions are easily dissociated.

The coloring of the ink for recording of the present invention is not particularly limited, can be appropriately selected depending on the purpose, and includes yellow, magenta, cyan and black. By recording using an ink set combining two or more of these colorings, it is possible to form the multi-color image. By recording using the ink set combining all colors, it is possible to form the full color image.

The ink for recording of the present invention can be suitably used for the printer loading any inkjet head such as a so-called piezoelectric type inkjet head where the volume in an ink flow path is changed to jet the ink drop by deforming a vibration plate which forms a wall of the ink flow path using a piezoelectric element as a pressure generating means to apply the pressure to the ink in the ink flow path (see JP-A No. 02-51734), or a so-called thermal inkjet head where bubbles are generated by heating the ink in the ink flow path using an exothermic resistive element (see JP-A No. 61-59911), or an electrostatic inkjet head where the electrode and the vibration plate which forms the wall of the ink flow path are disposed in opposed positions, and the volume in the ink flow path is changed to jet the ink by an electrostatic power generated between the electrode and the vibration plate (see JP-A No. 06-71882).

The ink for recording of the present invention can be used suitably in various fields, can be used suitably in an image forming apparatus (printer etc.) by the inkjet recoding system, for example can be used for the printer having the function to facilitate the printing fixation by heating the paper to be recorded or the ink for recording at 50° C. to 200° C. during, before or after the printing, and particularly can be used suitably for the following ink cartridge, ink recorded matter, inkjet recording apparatus and inkjet recording method of the present invention.

(Ink Cartridge)

The ink cartridge of the present invention contains a container, and the ink for recording housed in the container, and further contains appropriately selected other members, if necessary.

The container is not particularly limited, and its shape, structure, size and material can be appropriately selected depending on the purpose. Examples thereof include plastic containers, and those having an ink bag formed by aluminium laminate film or resin film.

Subsequently, the ink cartridge will be described with reference to FIGS. 4 and 5. Here, FIG. 4 is a view showing one example of the ink cartridge of the present invention, and FIG. 5 is a view including a casing (outer packing) of the ink cartridge.

Figure 4:
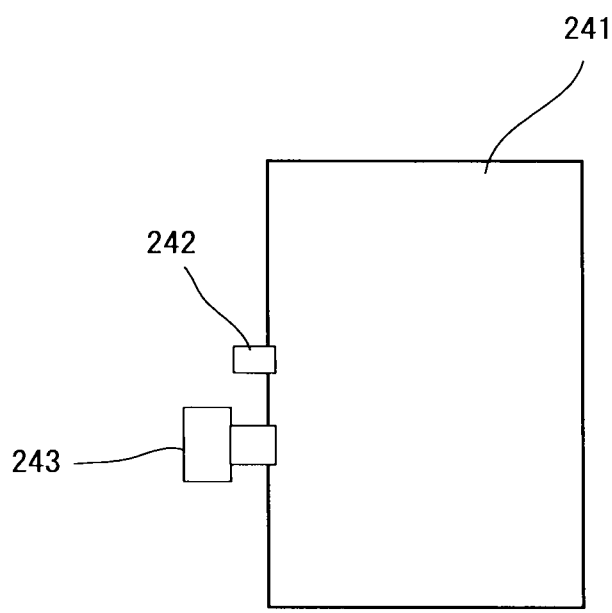
FIG. 4 is a schematic view showing one example of an ink cartridge of the present invention.
Figure 5:
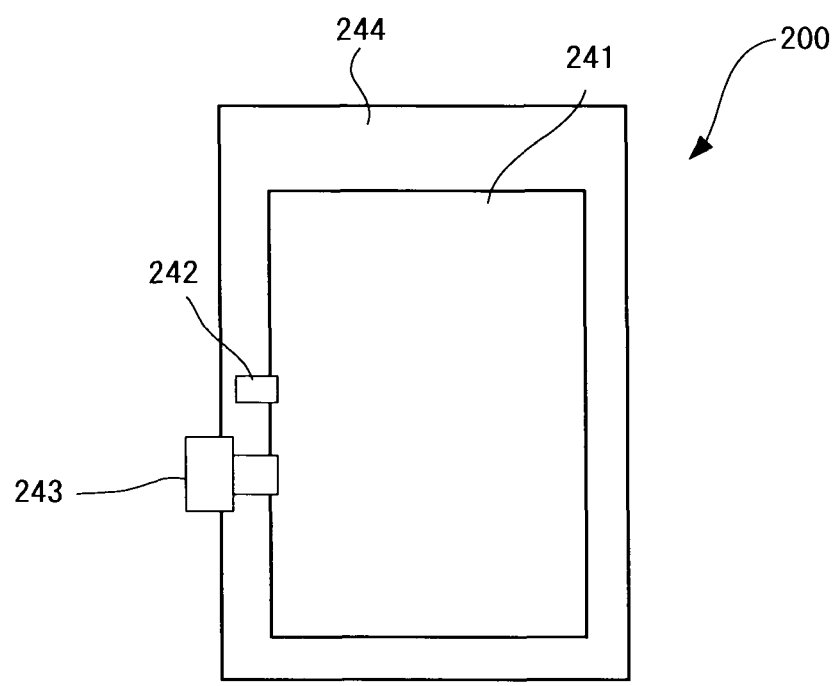
FIG. 5 is a schematic view showing the ink cartridge in FIG. 4 and a casing (outer packing).

As shown in FIG. 4, in the ink cartridge 200, the ink is filled from an ink inlet 242 into an ink bag 241, after deaerating, the ink inlet 242 is closed by fusion bond. In use, the ink is supplied by pushing a needle equipped with the main body of the apparatus into an ink outlet 243 composed of a rubber member.

The ink bag 241 is formed by a packing member such as aluminium laminate film having no air permeability. As shown in FIG. 5, this ink bag 241 is typically housed in a cartridge case 244 made from plastic, and used by detachably loading in various inkjet recording apparatuses.

The ink cartridge of the present invention houses the ink for recording (ink set) of the present invention, can be used by detachably loading in various inkjet recording apparatuses, and it is particularly preferably to use by detachably loading in the inkjet recording apparatus of the present invention described later.

(Inkjet Recording Apparatus and Inkjet Recording Method)

The inkjet recording apparatus of the present invention contains at least an ink ejecting unit, and further contains appropriately selected other units. e.g., a stimulus generation unit and a control unit, if necessary.

The inkjet recording method of the present invention contains at least an ink ejecting step, and further contains appropriately selected other steps, e.g., a stimulus generation step and a control step, if necessary.

The inkjet recording method of the present invention can be suitably carried out by the inkjet recording apparatus of the present invention, the ink ejecting step can be suitably carried out by the ink ejecting unit, and the aforementioned other steps can be suitably carried out by the aforementioned other units.

—Ink Ejecting Step and Ink Ejecting Unit—

The ink ejecting step is a step of ejecting the ink for recording of the present invention by applying the stimulus to the ink for recording to form the image.

The ink ejecting unit is a unit which ejects the ink for recording of the present invention by applying the stimulus to the ink for recording to form the image. The ink ejecting unit is not particularly limited. Examples thereof include various nozzles for inkjet printing.

In the present invention, it is preferable that at least portions of a liquid room section, a fluid resistive section, the vibration plate and a nozzle member are formed from materials containing at least any of silicon and nickel.

A nozzle diameter of the inkjet nozzle is preferably 30 μm or less and preferably 1 μm to 20 μm.

It is preferable to constitute so that the apparatus contains a subtank for supplying the ink onto the inkjet head and the subtank is supplied with the ink from the ink cartridge through a supplying tube.

The stimulus can be generated, for example by the stimulus generation unit. The stimulus is not particularly limited, can be appropriately selected depending on the purpose. Examples thereof include heat, pressure, vibration, and light. These may be used alone or in combination of two or more. Among them, the heat and the pressure are preferable.

Examples of the stimulus generation unit includes a heating device, a pressurizing device, a piezoelectric element, a vibration generating device, an ultrasonic oscillator and a light. Specifically, the examples of the stimulus generation unit are a piezoelectric actuator such as a piezoelectric element, a thermal actuator which utilizes phase change by membrane boiling of the liquid using an electric thermal conversion element such as an exothermal resistive element, a shape memory alloy actuator using a metallic phase change by thermal change, and a electrostatic actuator using the electrostatic power.

The aspect of ejection of the ink for recording is not particularly limited, is different depending on the stimulus, and when the stimulus is "heat", the method in which heat energy corresponding to recording signals is imparted using a thermal head to the ink for recording in a recording head to generate bubbles in the ink for recording by the heat energy and the ink for recording is jetted and spouted as the liquid drop from a nozzle pore of the recording head by pressure of the bubbles is included. When the stimulus is "pressure", the method in which the piezoelectric element is bended and the volume in a pressure room is reduced to eject and spout the ink for recording as droplets from the nozzle pore of the recording head by applying voltage to the piezoelectric element adhered at a position called the pressure room in the ink flow path in the recording head is included.

A size of the droplet of the ejected ink for recording is preferably 2 pl to 40 pl, a speed of ejecting and spouting is preferably 6 m/s to 20 m/s, its driving frequency is preferably 1 kHz or more, and its resolution is preferably 300 dpi or more.

It is preferable to jet the ink onto the printing region or non-printing region before water evaporation in the vicinity of the nozzle exceeds 30%.

The control unit is not particularly limited as long as it can control movements of each units, and can be appropriately selected depending on the purpose. Examples thereof include instruments such as a sequencer and a computer.

Figure 6:
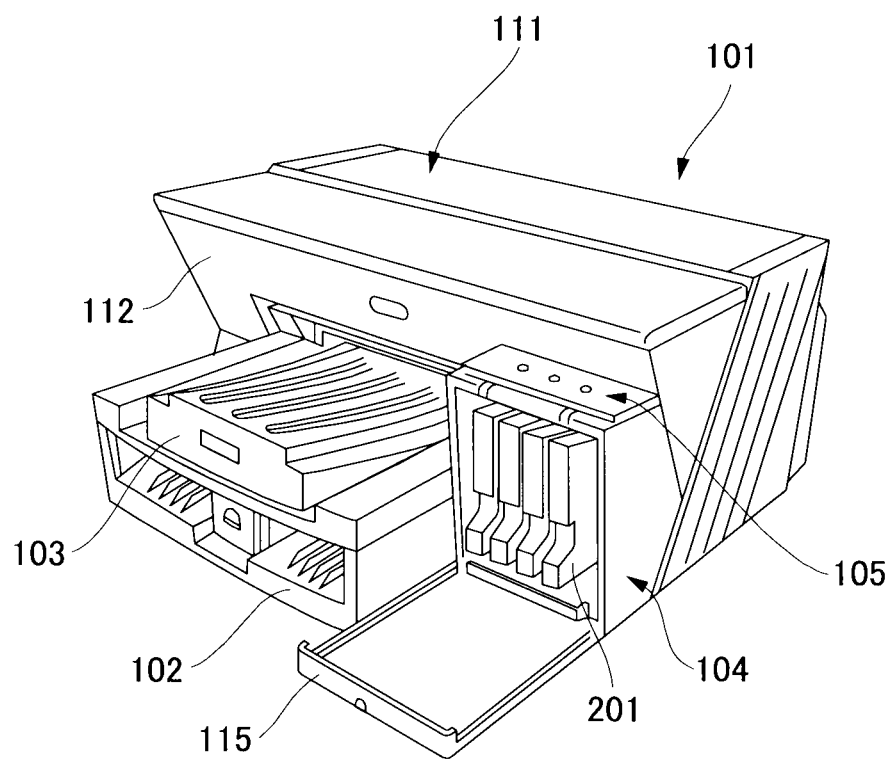
FIG. 6 is a perspective illustrating view showing an inkjet recording apparatus having a loading section of an ink cartridge with a cover of the loading section open.

One aspect of carrying out the inkjet recording method of the present invention by the inkjet recording apparatus of the present invention will be described with reference to the drawings. The inkjet recording apparatus shown in FIG. 6 has a main body 101 of the apparatus, a paper supply tray 102 for loading the paper loaded to the main body 101, a paper discharge tray 103 for stocking the paper on which the image has been recorded (formed) loaded to the main body 101, and an ink cartridge loading section 104. An operation section such as operation keys and displays 105 is disposed on the ink cartridge loading section 104. The ink cartridge loading section 104 has an openable and closable front cover 115 for detaching an ink cartridge 201. In FIG. 6, the references 111, and 112 respectively indicate an upper cover, and a front of the body.

Figure 7:
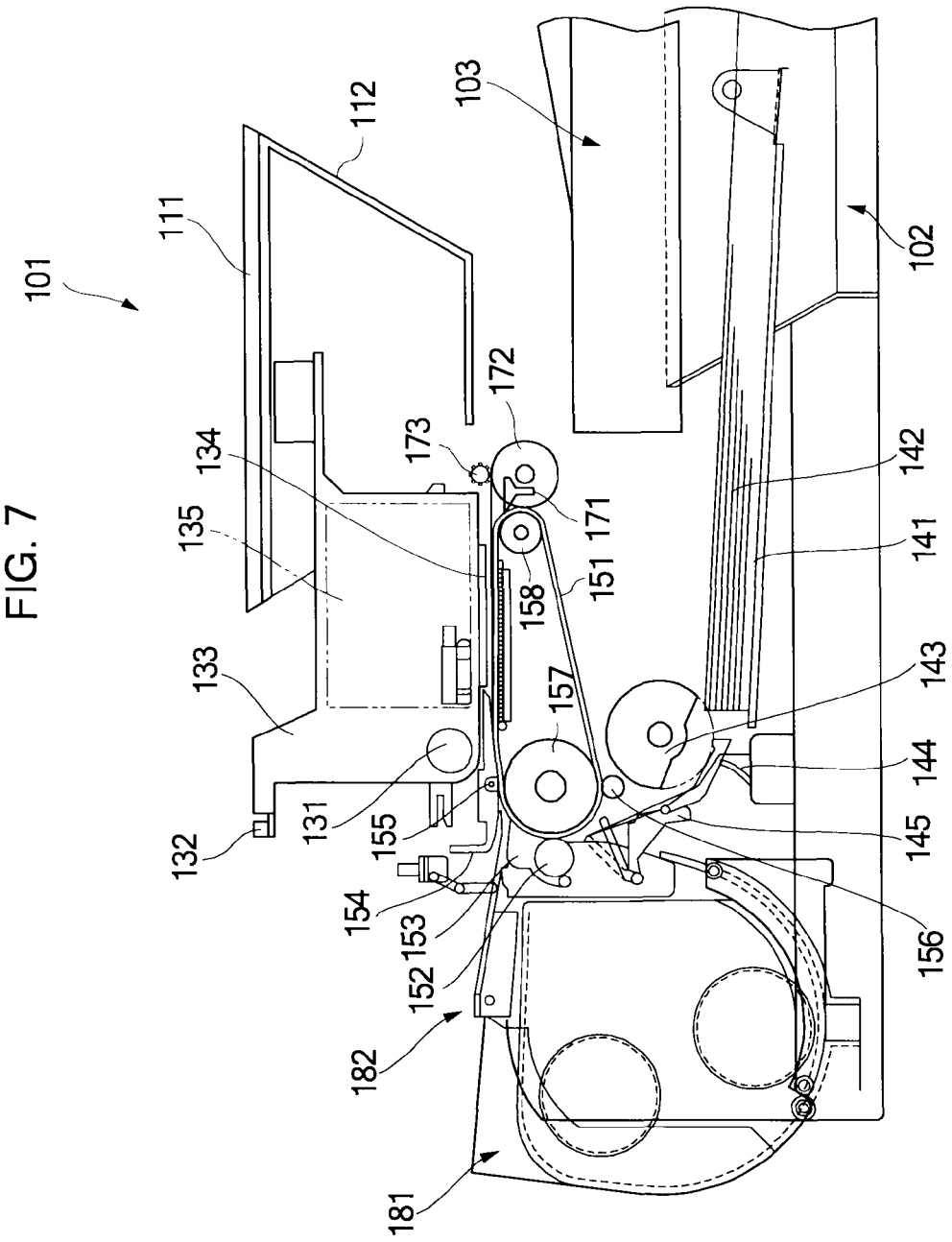
FIG. 7 is a schematic constitutive view illustrating an entire constitution of the inkjet recording apparatus.
Figure 8:
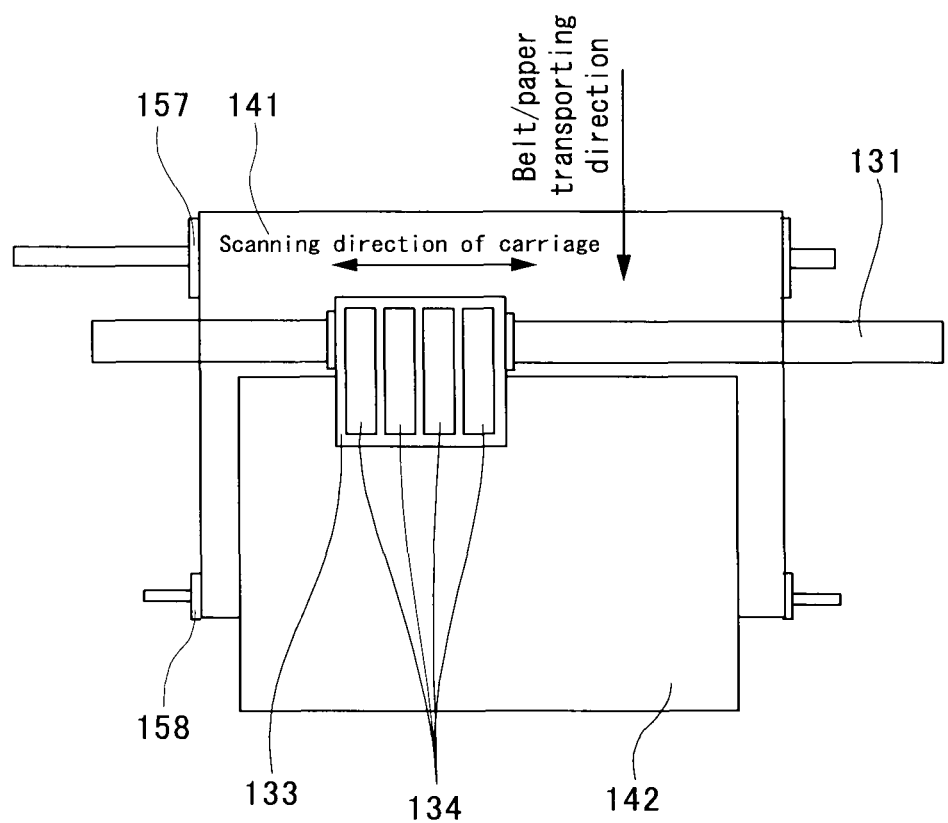
FIG. 8 is an enlarged schematic view showing one example of an inkjet head for use in the present invention.

As shown in FIGS. 7 and 8, a carriage 133 is retained with freely sliding in a main scanning direction by a guide rod 131 which is a guide member bridged laterally to right and left side plates not shown in the figure and a stay 132, and is moved and scanned by a main scanning motor (not shown in the figure) in an arrow direction in FIG. 8.

In the carriage 133, a recording head 134 composed of four heads for inkjet recording which jet ink drops for recording of respective colors such as yellow (Y), cyan (C), magenta (M) and black (B) is loaded so that multiple ink ejecting openings are arranged in a direction which intersects the main scanning direction and an ink ejecting direction is directed downward.

As the heat for inkjet recording which constitutes the recording head 134, it is possible to use those comprising the piezoelectric actuator such as a piezoelectric element, thermal actuator utilizing phase change by membrane boiling of the liquid using the electric thermal conversion element such as an exothermal resistive element, the shape memory alloy actuator using a metallic phase change by thermal change, and the electrostatic actuator using the electrostatic power, as the energy generation unit to jet the ink for recording.

The carriage 133 carries a subtank 135 for each color to supply each color ink. The ink for recording of the present invention is supplied from an ink cartridge 201 of the present invention loaded in the ink cartridge loading section 105 to the subtank 135 through the supplying tube for the ink for recording not shown in the figure.

Meanwhile, a paper supply section which supplies the paper 142 taken on a paper taking on section (pressure plate) 141 of the paper supply tray 102 comprises a half moon type roller (paper supply roller 143) which separates and feeds the paper one by one from the paper taking on section 141 and a separation pad 144 opposed to the paper supply roller 143 and composed of the material with large friction coefficient, and this separation pad 144 is biased toward the paper supply roller 143 side.

A feeding section for feeding the paper supplied from this paper supply section beneath the recording head 134 comprises a feeing belt 151 for feeding the paper 142 by absorbing electrostatically, a counter roller 152 for feeding the paper 142 sent through a guide 145 from the paper supply section by sandwiching with the feeding belt 151, a feeding guide 153 for feeding the paper sent in a nearly vertical upward direction on the feeding belt 151 by changing the direction of the paper at about 90°, and a tip pressurizing roller 156 biased to the feeding belt 151 side with a pushing member 154. An electrical charged roller 156 which is an electrical charge mean to charge the surface of the feeding belt 151 is also comprised.

The feeding belt is an endless belt, is disposed between a feeding roller 157 and a tension roller 158, and is capable of going around in a belt feeding direction. This feeding belt 151 has a surface layer which is a paper absorbing surface formed from, for example a resin material with a thickness of about 40 μm to which resistance control has not been given, for example, a copolymer of tetrafluoroethylene and ethylene, and a back layer (medium resistant layer, an earth layer) to which the resistance control by carbon has been given with the same material as this surface layer. A guide member 161 corresponding to the printing region by the recording head 134 is disposed on the back side of the feeding belt 151. A paper discharging section for discharging the paper 142 recorded at the recording head 134 comprises a separation nail 171 for separating the paper 142 from the feeding belt 151, a paper discharging roller 172 and a discharging half moon type roller 173. A paper discharge tray 103 is disposed beneath the paper discharging roller 172.

A both side paper supply unit 181 is detachably loaded on the backside section of the main body 101. The both side paper supply unit 181 takes in the paper 142 returned in a reverse direction rotation of the feeding belt 151, reverses the paper 142 and supplies it again between the counter roller 152 and the feeding belt 151. A manual paper supply section 182 is provided on the upper surface of the both side paper supply unit 181.

In this inkjet recording apparatus, the paper 142 is separated and supplied one by one from the paper supply section, the paper 142 supplied in the nearly vertical upward direction is guided by the guide 145, and fed by being sandwiched with the feeding belt 151 and the counter roller 152. The tip of the paper is further guided by the feeding guide 153, mounted on the feeding belt 151 at the tip pressurizing half moon type roller 155, and changed in about 90° in its feeding direction.

At that time, the feeding belt 157 is charged by the electrical charged roller 156, and the paper 142 is fed by being absorbed electrostatically. The ink drop is jetted onto the stopping paper 142 to record one line by driving the recording head 134 depending on the image signals with moving the carriage 133 there, and next line is recorded after feeding the paper 142 to a given amount. A recording operation is terminated by receiving a recording termination signal or a signal that a back end of the paper 142 has reached the recording region, and the paper is discharged to the paper discharge tray 103.

When a remaining amount near end of the ink for recording in the subtank 135 is detected, the ink for recording in a given amount is supplied from the ink cartridge 201 to the subtank 135.

In this inkjet recording apparatus, when the ink for recording in the ink cartridge 201 of the present invention is finished out, a housing in the ink cartridge 201 can be decomposed and only the ink bag inside can be changed. Even when the ink cartridge is constituted in vertical mounted front loading, it is possible to stably supply the ink for recording. Therefore, even when disposed by occupying upwards of the main body 101, for example, even when housed in a rack or an object has been placed on the main body 101, it is possible to easily change the ink cartridge 201.

Here, the example in which the ink for recording of the present invention was applied to a serial type (shuttle type) inkjet recording apparatus in which the carriage scans has been described, but the ink for recording can be likewise applied to a line type inkjet recording apparatus comprising a line type head.

The inkjet recording apparatus and the inkjet recording method of the present invention can be applied to various recordings by the inkjet recording system, and for example, can be suitably applied to printers for inkjet recording, facsimile apparatuses, copying apparatuses, printer/facsimile/copia composite machines, and the like (Ink Recorded Matter)

The ink recorded matter of the present invention is recorded by means of the inkjet recording apparatus in accordance with the inkjet recording method of the present invention. The ink recorded matter of the present invention has the image formed on the recording medium using the ink for recording of the present invention.

The recording medium is not particularly limited, and can be appropriately selected depending on the purpose. It is, for example, plain paper, glossy paper, special paper, fabric, film, OHP sheet, or the like. These may be used alone or in combination of two or more. Among them, as the recording medium, those having the Stockigt size degree of 3 seconds or more are preferable.

The ink recorded matter has the high image quality with no bleeding, is excellent in stability with time, and can be suitably used for various intended uses as documents on which various printing or images have been recorded.

According to the present invention, the conventional problems can be solved, and by increasing the solid contents of the coloring agent and the water-dispersible resin in the ink for recording and optimizing the solid content of the water-dispersible resin for the color material to assure the permeability, it is possible to assure high color forming property and image quality, and the reliability and provide the ink for recording suitable for inkjet recording as well as the ink cartridge, the ink recorded matter, the inkjet recording apparatus and the inkjet recording method using the ink for recording.

Examples of the present invention will be described below, but the present invention is not limited to these Examples.

Manufacturing Example 1

Preparation of Polymer Solution A

After thoroughly replacing with nitrogen gas in a 1 L flask equipped with a mechanical stirrer, a thermometer, a nitrogen gas inlet tube, a reflux tube and a dripping funnel, 11.2 g of styrene, 2.8 g of acrylic acid, 12.0 g of lauryl methacrylate, 4.0 g of polyethylene glycol methacrylate, 4.0 g of styrene macromer and 0.4 g of mercaptoethanol were mixed and heated to 65° C.

Subsequently, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobismethyl valeronitrile and 18 g of methyl ethyl ketone was dripped in the flask over 2.5 hours. After dripping, a mixed solution of 0.8 g of azobismethyl valeronitrile and 18 g of methyl ethyl ketone was dripped in the flask over 0.5 hours. After maturing at 65° C. for one hour, 0.8 g of azobismethyl valeronitrile was added, and the mixture in the flask was matured for an additional one hour. After completion of the reaction, 364 g of methyl ethyl ketone was added in the flask to prepare 800 g of a polymer solution A with a concentration of 50% by mass.

—Preparation of Pigment-Containing Polymer Particle Aqueous Dispersion—

Subsequently, 28 g of the obtained polymer A, 42 g of C.I. pigment red 122, 13.6 g of 1 mol/L aqueous solution of potassium hydroxide, 20 g of methyl ethyl ketone and 13.6 g of ion-exchange water were thoroughly stirred, and then kneaded using a roll mill. The resulting paste was added to 200 g of purified water, stirred thoroughly using the roll mill, and then methyl ethyl ketone was evaporated by using an evaporator, to thereby prepare a magenta polymer particle aqueous dispersion of Manufacturing Example 1 which contains the 15% by mass pigment, and has the solid content of 20% by mass.

Manufacturing Example 2

Preparation of Surface Treated Pigment Dispersion

To 3,000 mL of 2.5 N sodium sulfate solution, 90 g of carbon black having CTAB specific surface area of 150 $cm^2/g$ and DBP oil absorption of 100 mL/100 g was added, and an oxidation treatment was given thereto by stirring at a speed of 300 rpm at 60° C. to react for 10 hours. This reaction solution was filtrated, filtrated carbon black was neutralized with sodium hydroxide and ultrafiltration was performed. The resulting carbon black was washed with water, dried, and dispersed in purified water so that a solid content thereof to be 20% by mass, to thereby prepare a black pigment dispersion of Manufacturing Example 2.

Manufacturing Example 3

Preparation of Pigment-Surfactant Dispersion

After mixing 100 g of C.I. pigment blue 15:3, 24.8 g of polyoxyethyleneoleyl ether ammonium sulfate and 175.2 g of purified water, the mixture was dispersed using a wet type sand mill, 414.3 g of purified water was added thereto, the mixture was further mixed and centrifuged to remove coarse particles, to thereby prepare a cyan pigment dispersion of Manufacturing Example 3 which contains 14% by mass pigment, and has the solid content of 17.5% by mass.

Manufacturing Example 4

Preparation of Polymer Particle Dispersion B

After thoroughly replacing with nitrogen gas in a 1 L flask equipped with a mechanical stirrer, a thermometer, a nitrogen gas inlet tube, a reflux tube and a dripping funnel, 8.0 g of Latemul S-180 and 350 g of ion-exchange water were added, mixed, and heated to 65° C. After raising the temperature, 3.0 g of t-butylperoxobenzoate and 1.0 g of sodium isoascorbate, which were polymerization initiators, were added, and after 5 minutes, 45 g of methyl methacrylate, 160 g of 2-ethylhexyl methacrylate, 5 g of acrylic acid, 45 g of butyl methacrylate, 30 g of cyclohexyl methacrylate, 15 g of vinyl triethoxysilane, 8.0 g of Latemul S-180 and 340 g of ion-exchange water were mixed, and dripped over 3 hours. Subsequently, after heating and maturing at 80° C. for 2 hours, the reaction mixture was cooled to the ambient temperature, and adjusted its pH value to pH 7 to 8 with sodium hydroxide. Ethanol was evaporated using the evaporator, and the water content was adjusted, to thereby prepare 730 g of a polymer particle dispersion B of Manufacturing Example 4 having a solid content of 40% by mass.

Examples 1 to 16, and Comparative Examples 1 to 12

The ink for recording was produced by the following procedure.

First, the wetting agent, the permeating agent, the surfactant and water shown in Tables 1 to 4 were uniformly mixed by stirring for one hour. The water-dispersible resin was added to this mixed solution, and stirred for one hour. Then, the pigment dispersion and the anti-foaming agent were added thereto, and mixed for one hour. Each ink for recording used for the evaluation was prepared by filtrating this dispersion with pressure using a cellulose acetate membrane filter with an average pore size of 0.8 μm to remove coarse particles and dusts.

In Example 3 and Comparative Example 1, the pigment dispersion, the water-dispersible resin, and glycerin were mixed, and concentrated by using the evaporator, to thereby prepare a condensed dispersion mixed solution. Separately, the wetting agent, the permeating agent, the surfactant and water were uniformly mixed by stirring for one hour. The above concentrated dispersion mixed solution and the anti-foaming were added to the resulting mixed solution, and stirred for one hour. Each ink for recording used for the evaluation was prepared by filtrating this dispersion with pressure using a cellulose acetate membrane filter with an average pore size of 0.8 μm to remove coarse particles and dusts.

TABLE 1

| Ingredient (% by mass) | | Example 1 | 2 | 3 | 4 | 5 | 6 | 7 | 8 |
|---|---|---|---|---|---|---|---|---|---|
| Pigment dispersion | Pigment-containing polymer particle aqueous dispersion (M1) | 33.5 | 33.5 | 33.5 | — | — | — | — | — |
| | Surface-treated pigment dispersion (M2) | — | — | — | 30.0 | 30.0 | 30.0 | — | 30.0 |
| | Pigment-surfactant dispersion (M3) | — | — | — | — | — | — | 21.4 | — |
| Water-dispersible resin | Polymer dispersion B (M4) | 37.5 | 25.0 | 12.5 | 37.5 | 25.0 | 12.5 | — | 37.45 |
| | Jurimer ET-410 | — | — | — | — | — | — | — | — |
| | Nipol LX 430 | — | — | — | — | — | — | 40 | — |
| Wetting agent | 3-Methyl-1,3-butanediol | 22.5 | 22.5 | 22.5 | 16.7 | 16.7 | 16.7 | — | 14.0 |
| | Triethylene glycol | — | — | — | — | — | — | 15 | — |
| | Glycerin | 7.5 | 7.5 | 7.5 | 8.3 | 8.3 | 8.3 | 7.5 | 7.0 |
| Permeating agent | Octanediol | 2 | 2 | 2 | 2 | 2 | 2 | — | — |
| | 1,2-Hexanediol | — | — | — | — | — | — | 3 | 3 |
| | 2-Pyrrolidone | — | — | — | 2 | 2 | 2 | — | — |
| Surfactant | Polyfox PF-151N | — | — | 1.0 | — | 0.5 | 0.5 | — | — |
| | Zonil FSO-100 | — | 0.8 | — | 0.3 | — | 0.3 | — | — |
| | Zonil FS-300 | 1.0 | — | — | 0.5 | 0.5 | — | 1.0 | — |
| | Softanol EP-5035 | — | — | — | — | — | — | — | 2.0 |
| Anti-fungal agent | Proxel GXL | 0.05 | 0.05 | 0.05 | 0.05 | 0.05 | 0.05 | 0.05 | 0.05 |
| Anti-foaming agent | KS 508 | 0.1 | 0.1 | 0.1 | 0.1 | 0.1 | 0.1 | 0.1 | 0.1 |
| Purified water | | — | RQ | RQ | RQ | RQ | RQ | RQ | RQ |
| Total (% by mass) | | 104.15 | 100 | 100 | 100 | 100 | 100 | 100 | 100 |

TABLE 2

| Ingredient (% by mass) | | Example 9 | 10 | 11 | 12 | 13 | 14 | 15 | 16 |
|---|---|---|---|---|---|---|---|---|---|
| Pigment dispersion | Pigment-containing polymer particle aqueous dispersion (M1) | — | — | — | — | — | — | — | — |
| | Surface-treated pigment dispersion (M2) | — | 40.0 | 40.0 | 30.0 | 35.0 | 40.0 | 30.0 | 45.0 |
| | Pigment-surfactant dispersion (M3) | 42.8 | — | — | — | — | — | — | — |
| Water-dispersible resin | Polymer dispersion B (M4) | — | 15 | 13 | 40 | 31 | 24 | — | 20 |
| | Jurimer ET-410 | 20 | — | — | — | — | — | — | — |
| | Nipol LX 430 | — | — | — | — | — | — | 30 | — |
| Wetting agent | 3-Methyl-1,3-butanediol | 22 | — | — | 14 | 15 | 13 | — | 9 |
| | Triethylene glycol | — | 20 | 20 | — | — | — | 9 | — |
| | Glycerin | 11 | 10 | 10 | 13 | 16 | 20 | 18 | 23 |

TABLE 2-continued

| Ingredient (% by mass) | | Example | | | | | | | |
|---|---|---|---|---|---|---|---|---|---|
| | | 9 | 10 | 11 | 12 | 13 | 14 | 15 | 16 |
| Permeating agent | Octanediol | — | — | — | 2 | 2 | 2 | — | 2 |
| | 1,2-Hexanediol | 3 | 3 | 3 | — | — | — | 3 | — |
| | 2-Pyrrolidone | — | — | — | — | — | — | — | — |
| Surfactant | Polyfox PF-151N | 1.0 | — | — | — | — | — | 0.5 | — |
| | Zonil FSO-100 | — | 0.85 | 0.85 | 0.85 | 0.85 | 0.85 | — | 0.85 |
| | Zonil FS-300 | — | — | — | — | — | — | 0.5 | — |
| | Softanol EP-5035 | — | — | — | — | — | — | — | — |
| Anti-fungal agent | Proxel GXL | 0.05 | 0.05 | 0.05 | 0.05 | 0.05 | 0.05 | 0.05 | 0.05 |
| Anti-foaming agent | KS 508 | 0.1 | 0.1 | 0.1 | 0.1 | 0.1 | 0.1 | 0.1 | 0.1 |
| Purified water | | RQ | RQ | RQ | RQ | RQ | RQ | RQ | RQ |
| Total (% by mass) | | 100 | 100 | 100 | 100 | 100 | 100 | 100 | 100 |

TABLE 3

| Ingredient (% by mass) | | Comparative Example | | | | | | | |
|---|---|---|---|---|---|---|---|---|---|
| | | 1 | 2 | 3 | 4 | 5 | 6 | 7 | 8 |
| Pigment dispersion | Pigment-containing polymer particle aqueous dispersion (M1) | 33.5 | 73.5 | — | — | — | — | 33.5 | — |
| | Surface-treated pigment dispersion (M2) | — | — | 30.0 | 5.0 | 20.0 | 20.0 | — | 40.0 |
| | Pigment-surfactant dispersion (M3) | — | — | — | — | — | — | — | — |
| Water-dispersible resin | Polymer dispersion B (M4) | 50 | — | — | — | 25. | 25 | 15 | 12 |
| | Jurimer ET-410 | — | — | — | 40 | — | — | — | — |
| | Nipol LX 430 | — | — | — | — | — | — | — | — |
| Wetting agent | 3-Methyl-1,3-butanediol | 22.5 | 15.0 | 16.7 | 22.0 | — | 30.0 | 24.0 | — |
| | Triethylene glycol | — | — | — | — | 10 | — | — | 20 |
| | Glycerin | 7.5 | 7.0 | 8.3 | 11.0 | 5.0 | 15.0 | 12.0 | 10.0 |
| Permeating agent | Octanediol | 2 | 2 | 2 | — | 2 | 2 | 2 | — |
| | 1,2-Hexanediol | — | — | — | 3 | — | — | — | 3 |
| | 2-Pyrrolidone | — | — | 2 | — | 2 | 2 | — | — |
| Surfactant | Polyfox PF-151N | — | — | 1 | — | 1 | — | — | — |
| | Zonil FSO-100 | — | — | — | 0.85 | — | — | — | 0.85 |
| | Zonil FS-300 | 1 | — | — | — | — | 1 | — | — |
| | Softanol EP-5035 | — | 1 | — | — | — | — | — | — |
| Anti-fungal agent | Proxel GXL | 0.05 | 0.05 | 0.05 | 0.05 | 0.05 | 0.05 | 0.05 | 0.05 |
| Anti-foaming agent | KS 508 | 0.1 | 0.1 | 0.1 | 0.1 | 0.1 | 0.1 | 0.1 | 0.1 |
| Purified water | | — | RQ | RQ | RQ | RQ | RQ | RQ | RQ |
| Total (% by mass) | | 116.65 | 100 | 100 | 100 | 100 | 100 | 100 | 100 |

TABLE 4

| Ingredient (% by mass) | | Comparative Example | | | |
|---|---|---|---|---|---|
| | | 9 | 10 | 11 | 12 |
| Pigment dispersion | Pigment-containing polymer particle | — | — | — | — |

TABLE 4-continued

|  | Ingredient (% by mass) | Comparative Example | | | |
|---|---|---|---|---|---|
|  |  | 9 | 10 | 11 | 12 |
|  | aqueous dispersion (M1) | | | | |
|  | Surface-treated pigment dispersion (M2) | 40.0 | 35.0 | 15.0 | 20.0 |
|  | Pigment-surfactant dispersion (M3) | — | — | — | — |
| Water-dispersible resin | Polymer dispersion B (M4) | 11 | — | 10 | 12.5 |
|  | Jurimer ET-410 | — | — | — | — |
|  | Nipol LX 430 | — | 50 | — | — |
| Wetting agent | 3-Methyl-1,3-butanediol | — | 7 | 20 | 20 |
|  | Triethylene glycol | 20 | — | — | — |
|  | Glycerin | 10 | 4 | 15 | 15 |
| Permeating agent | Octanediol | — | 2 | 2 | 2 |
|  | 1,2-Hexanediol | 3 | — | — | — |
|  | 2-Pyrrolidone | — | — | — | — |
| Surfactant | Polyfox PF-151N | — | — | — | — |
|  | Zonil FSO-100 | 0.85 | 0.85 | 0.85 | 0.85 |
|  | Zonil FS-300 | — | — | — | — |
|  | Softanol EP-5035 | — | — | — | — |
| Anti-fungal agent | Proxel GXL | 0.05 | 0.05 | 0.05 | 0.05 |
| Anti-foaming agent | KS 508 | 0.1 | 0.1 | 0.1 | 0.1 |
| Purified water |  | RQ | RQ | RQ | RQ |
| Total (% by mass) |  | 100 | 100 | 100 | 100 |

Abbreviations and product names in Tables 1 to 4 represent the following meanings.

M1-M4: Manufacturing Examples 1-4

Latemul S-180: a reactive emulsifier having unsaturated carbons (supplied from Kao Corporation, ingredient 100% by mass)

Jurimer ET-410: soap-free type acrylic copolymer emulsion (supplied from Nippon Junyaku Co., Ltd., solid content 30% by mass, pH 8.0, glass transfer temperature (Tg) 44° C.)

Nipol LX430: modified styrene-butadiene based copolymer emulsion (supplied Zeon Corporation, solid content 49% by mass, pH 7.0, glass transfer temperature (Tg) 12° C.)

Polyfox PF-151N: oligomer type nonionic fluorine based surfactant (supplied from OMNOVA, ingredient 50% by mass, butyl carbitol 10% by mass)

Zonil FSO-100, FS-300: polyoxyethylene perfluoroalkyl ether (supplied from DuPont, ingredient 100% by mass)

Softanol EP-5035: polyoxyethylene polyoxypropylene branched alkyl ether (supplied from Nippon Shokubai Co., Ltd., ingredient 100% by mass)

Proxel GXL: anti-fungal agent containing 1,2-benzisothiazolin-3-on as the major ingredient (Avecia Ltd., ingredient 20% by mass, containing dipropylene glycol)

KS508: self emulsification type silicone anti-foaming agent (supplied from Shin-Etsu Silicones Co., Ltd., ingredient 100% by mass)

Subsequently, for the resulting inks for recording, various properties were evaluated as follows. Results are shown in Tables 5, 6, 7 and 8.

<Measurement of Physical Property in Ink>

The viscosity of the ink was measured at 25° C. using the viscometer (supplied form Toki Sangyo Co., Ltd.).

The surface tension of the ink was measured at 25° C. using the full automatic surface tension meter (CBVP-Z supplied from Kyowa Interface Science Co., Ltd.).

<Preparation of Printing Evaluation>

Under the environment controlled at a temperature of 23° C. and a humidity of 50%, using the inkjet printer (IPSIO G707 supplied from Ricoh Co., Ltd.), the printer was set up to apply the same amount of the ink onto the recording medium by changing the driving voltage of the piezoelectric element so that the amount of the ejected ink was made uniform.

<Ejecting Stability>

A chart obtained by filling 5% area of A4 sized paper with a solid image of one color made by Microsoft Word 2000 was printed out consequently 200 times by Type 6200 (supplied from NBS Ricoh Co., Ltd.), ejecting disturbance of each nozzle after printing out was evaluated. For the printing mode, "plain paper-standard fast" mode which was the user-established mode for the plain paper was changed to "no color correction" mode by the driver attached to the printer.

[Evaluation Criteria]

B: No ejecting disturbance

D: Disturbed ejecting or no ejecting

<Printing Density>

A chart on which a 64 point symbol "■" made by Microsoft Word 2000 had been written was printed out by Xerox 4024 (supplied from Fuji Xerox Co., Ltd.), the color of the symbol "■" part on the printing surface was measured using X-Rite 938, and evaluated by the following evaluation criteria. For the printing mode, "plain paper-standard fast" mode which was the user-established mode for the plain paper was changed to "no color correction" mode by the driver attached to the printer.

[Evaluation Criteria]

B: Black 1.15 or more and color 0.85 or more

C: Black 1.05 or more and color 0.75 or more and less than 0.85

D: Black less than 1.05 and color less than 0.75

<Strike-Through Property>

As was the case with the printing density, the chart was printed out, the color of the backside of the symbol "■" part was measured using X-Rite 938, a background density of the paper was subtracted, and the show through property was evaluated by the following evaluation criteria.

[Evaluation Criteria]
 B: less than 0.05
 C, 0.05 or more and less than 0.1
 D: 0.1 or more <Water Resistance>

As was the case with the printing density, the chart was printed out by Type 6200, the symbol "■" part on the printing surface was dried at 23° C. and 50% RH for 24 hours. Then the chart was immersed in water at 30° C. for one minutes, slowly lifted up and left stand to dry, and evaluated by the following evaluation criteria.
[Evaluation Criteria]
 B: No bleeding of color
 D: Color was bled <Abrasion Resistance>

A chart having a single color solid image of 3 cm×3 cm made by Microsoft Word 2000 thereon was printed out on matte glossy paper made specifically for Ricoh Gel Jet Printer (supplied from NBS Ricoh Co., Ltd.), and dried at 23° C. and 50% RH for 24 hours. JIS L 0803 cotton No. 3 attached to CM-1 type Clock meter with double stick tape was repeated 10 times to hit the printed part, ink staining on the cotton fabric was measured using X-Rite 938, and the density of the ink staining after subtracting the background density of the cotton fabric was evaluated by the following evaluation criteria.

[Evaluation Criteria]
 B: Density of ink staining was less than 0.1
 D: Density of ink staining was 0.1 or more <Marker Resistance>

A chart having letter strings using Gothic font made by Microsoft Word 2000 thereon was printed out by Type 6200, 10 minutes after printing, the letter strings part on the printing surface was marked with Optics (yellow), a fluorescent marker pen supplied from Zebra Co., Ltd., and the presence or absence of bleeding and staining of the ink was evaluated by the following evaluation criteria.
[Evaluation Criteria]
 B: No staining
 C: Fine staining determined by steady eye
 D: Stained <Letter Quality>

A chart having the letter strings of 4 to 20 points made by Microsoft Word 2000 thereon was printed out by Type 6200, My Paper, My Recycle Paper 100 (all supplied from NBS Ricoh), Xerox 4024 (supplied from Fuji Xerox Co., Ltd.), PB paper (supplied from Canon Inc.), Yamayuri Paper (supplied from Oji Paper Co., Ltd.), 4CC 100 g/m2 (supplied from STORANSO) and Tidal MP (supplied from HAMMER MILL), and the bleeding degree of the ink was evaluated by the following evaluation criteria by magnifying the letter strings on the printed surface.

[Evaluation Criteria]
 A: No bleeding and clear letter strings
 B: Bleeding like whiskers occurred on some paper but clear printing was seen unless magnified
 C: Bleeding like whiskers occurred on all paper and printing was locked thick unless magnified
 D: Bleeding was identified when not magnified <Drying Property>

As was the case with the printing density, the chart was printed out, a filter paper was pressed against the symbol "■" part on the printing surface printed by Type 6200 immediately after printing, and the presence or absence of transfer was evaluated by the following evaluation criteria.

[Evaluation Criteria]
 B: No transfer and staining
 C: Slight transfer and staining
 D: Transferred and stained

TABLE 5

|  | Example | | | | | | | |
| --- | --- | --- | --- | --- | --- | --- | --- | --- |
|  | 1 | 2 | 3 | 4 | 5 | 6 | 7 | 8 |
| Viscosity (mPa·s) | 15.5 | 10.5 | 7.5 | 13.5 | 8.9 | 6.2 | 8.8 | 10.8 |
| Surface tension (mN/m) | 26.1 | 25.8 | 25.6 | 26.0 | 25.7 | 25.3 | 24.8 | 31.0 |
| Ratio of pigment to resin (B/C) | 0.3 | 0.43 | 0.75 | 0.4 | 0.6 | 1.2 | 0.15 | 0.4 |
| Solid content (B + C) (% by mass) | 20.8 | 16.7 | 11.7 | 21.0 | 16.0 | 11.0 | 23.0 | 21.0 |
| Wetting agent amount (% by mass) | 28.8 | 30 | 30 | 25 | 25 | 25 | 23 | 21 |
| Ratio of glycerin/ wetting agent (% by mass) | 25 | 25 | 25 | 33 | 33 | 33 | 33 | 33 |
| Ejecting stability | B | B | B | B | B | B | B | B |
| Printing density | B | B | B | B | B | B | B | C |
| Strike-through property | B | B | B | B | B | B | B | B |
| Water resistance | B | B | B | B | B | B | B | B |
| Abrasion resistance | B | B | B | B | B | B | B | B |
| Marker resistance | B | B | B | B | B | B | B | B |
| Letter quality | A | A | B | A | A | B | A | B |
| Drying property | B | B | B | B | B | B | B | C |

TABLE 6

|  | Example | | | | | | | |
|---|---|---|---|---|---|---|---|---|
|  | 9 | 10 | 11 | 12 | 13 | 14 | 15 | 16 |
| Viscosity (mPa·s) | 9.0 | 8.1 | 7.8 | 13.6 | 14.1 | 13.8 | 11.1 | 12.6 |
| Surface tension (mN/m) | 25.6 | 21.5 | 21.5 | 21.4 | 21.5 | 21.5 | 24.1 | 21.6 |
| Ratio of pigment to resin (B/C) | 1.00 | 1.33 | 1.54 | 0.38 | 0.56 | 0.83 | 0.40 | 1.13 |
| Solid content (B + C) (% by mass) | 12 | 14 | 13 | 22 | 19 | 18 | 21 | 17 |
| Wetting agent amount (% by mass) | 33 | 30 | 30 | 27 | 31 | 33 | 27 | 32 |
| Ratio of glycerin/wetting agent (% by mass) | 33 | 33 | 33 | 48 | 52 | 61 | 67 | 72 |
| Ejecting stability | B | B | B | B | B | B | B | B |
| Printing density | B | B | B | C | B | B | C | B |
| Strike-through property | B | B | B | B | B | C | C | C |
| Water resistance | B | B | B | B | B | B | B | B |
| Abrasion resistance | B | C | C | B | B | B | B | B |
| Marker resistance | B | C | C | B | B | B | B | B |
| Letter quality | B | A | B | A | B | C | C | C |
| Drying property | B | B | B | B | B | B | B | B |

TABLE 7

|  | Comparative Example | | | | | | | |
|---|---|---|---|---|---|---|---|---|
|  | 1 | 2 | 3 | 4 | 5 | 6 | 7 | 8 |
| Viscosity (mPa·s) | 24.9 | 7.8 | 4.6 | 12.5 | 3.6 | 21.1 | 11.7 | 7.6 |
| Surface tension (mN/m) | 26.2 | 32.5 | 24.8 | 20.8 | 24.1 | 25.6 | 38 | 21.4 |
| Ratio of pigment to resin (B/C) | 0.23 | 2.97 | — | 0.08 | 0.4 | 0.4 | 0.65 | 1.67 |
| Solid content (B + C) (% by mass) | 22.98 | 14.7 | 6 | 13 | 14 | 14 | 13 | 13 |
| Wetting agent amount (% by mass) | 25.7 | 22 | 25 | 33 | 15 | 45 | 36 | 30 |
| Ratio of glycerin/wetting agent (% by mass) | 25 | 32 | 33 | 33 | 33 | 33 | 33 | 33 |
| Ejecting stability | D | B | B | B | B | D | B | B |
| Printing density | — | B | C | D | C | — | B | B |
| Strike-through property | — | B | B | B | B | — | B | C |
| Water resistance | — | B | D | B | B | — | B | B |
| Abrasion resistance | — | D | D | C | B | — | D | C |
| Marker resistance | — | D | D | B | B | — | D | D |
| Letter quality | — | B | D | B | D | — | A | B |
| Drying property | — | C | B | B | B | — | D | B |

In Table 7, "-" indicates that the measurement was not done because no image capable of being evaluated was obtained as a result of causing nozzle cast-off or ink jet bending due to poor ejecting of the ink.

TABLE 8

|  | Comparative Example | | | |
|---|---|---|---|---|
|  | 9 | 10 | 11 | 12 |
| Viscosity (mPa·s) | 7.3 | 63.2 | 6.4 | 7.5 |
| Surface tension (mN/m) | 21.4 | 23.2 | 21 | 21.1 |
| Ratio of pigment to resin (B/C) | 1.82 | 0.28 | 0.75 | 0.8 |
| Solid content (B + C) (% by mass) | 12 | 32 | 7 | 9 |
| Wetting agent amount (% by mass) | 30 | 11 | 35 | 35 |
| Ratio of glycerin/wetting agent (% by mass) | 33 | 36 | 43 | 43 |
| Ejecting stability | B | D | B | B |
| Printing density | B | — | D | D |
| Strike-through property | C | — | B | B |
| Water resistance | B | — | B | B |
| Abrasion resistance | C | — | B | B |
| Marker resistance | D | — | B | B |
| Letter quality | B | — | B | A |
| Drying property | B | — | B | B |

In Table 8, "-" indicates that the measurement was not done because no image capable of being evaluated was obtained as a result of causing nozzle cast-off or ink jet bending due to poor ejecting of the ink.

From the results in Tables 5 to 8, in the inks for recording of Examples 1 to 16, which fulfill all requirements that (1) the total content of the coloring agent and the water-dispersible resin is 10% to 30% by mass in terms of solid content, (2) the ratio B/C of the solid content B of the coloring agent to the solid content C of the water-dispersible resin is 0.1 to 1.6, and (3) the viscosity is 5 mPa·s to 20 mPa·s at 25° C., and (4) the surface tension is 35 mN/m or less, the high color forming property and image quality, the reliability can be assured, and the image formation with high quality where the chroma is high and the color tone is good is possible not only on the recording paper made specifically but also on the plain paper compared with the inks for recording of Comparative Examples 1 to 12 which do not fulfill at least one of the above (1) to (4).

Experiment 1

Effect of Increase of Total Solid Content of Coloring Agent and Water-Dispersible Resin on Coloring Property The pigment-containing polymer particle aqueous dispersion in Manufacturing Example 1 and the polymer dispersion B in Manufacturing Example 4 were added to a mixture of 20 parts by mass of 3-methyl-1,3-butanediol, 10 parts by mass of glycerin, 1 part by mass of octanediol, and 0.8 parts by mass of Zonil FSO-100 to prepare an ink for recording.

As A group, the amount of the pigment-containing polymer particle aqueous dispersion in Manufacturing Example 1 was increased. As B group, 6.67 parts by mass of the pigment-containing polymer particle aqueous dispersion in Manufacturing Example 1 was added and the amount of the polymer dispersion B in Manufacturing Example 4 was increased.

Subsequently, the printer was set up so that the same amount of the ink was adhered onto the recording medium, the chart with color gradation was printed on the matte glossy paper made specifically for Ricoh Gel Jet Printer supplied from NBS Ricoh Co., Ltd. The color of the image was measured using X-Rite 938, and the chroma at the same image density (0.8) was obtained as the result. The relationship between the chroma and the total solid content of the coloring agent and the water-dispersible resin is shown in FIG. 1. The chroma shown in FIG. 1 is Chroma $C^*_{ab}$ of CIE(1976)ab. Chroma $C^*_{ab}$ was measured in accordance with JIS Z8729. Specifically, Chroma $C^*_{ab}$ was obtained from the following formula:

$$C^*_{ab} = [(a^*)^2 + (b^*)^2]^{0.5}$$

From the results in FIG. 1, it has been found that the increase of the solid content due to the pigment increase in the A group remarkably reduced the chroma, and the A group is inferior to the B group. It is possible that the increase of the solid content by the addition of the water-dispersible resin makes the effect on the color forming property lower compared with the increase of only the pigment.

Experiment 2

Figure 2:
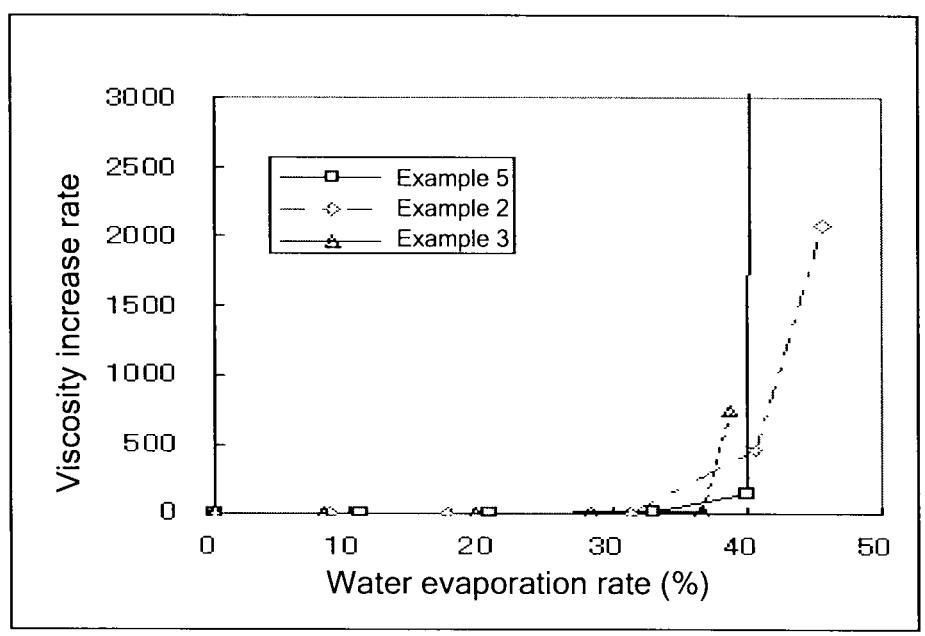
FIG. 2 is a graph showing a relationship between the water-evaporation rate and the viscosity-increase rate in Experiment 2.
Figure 3:
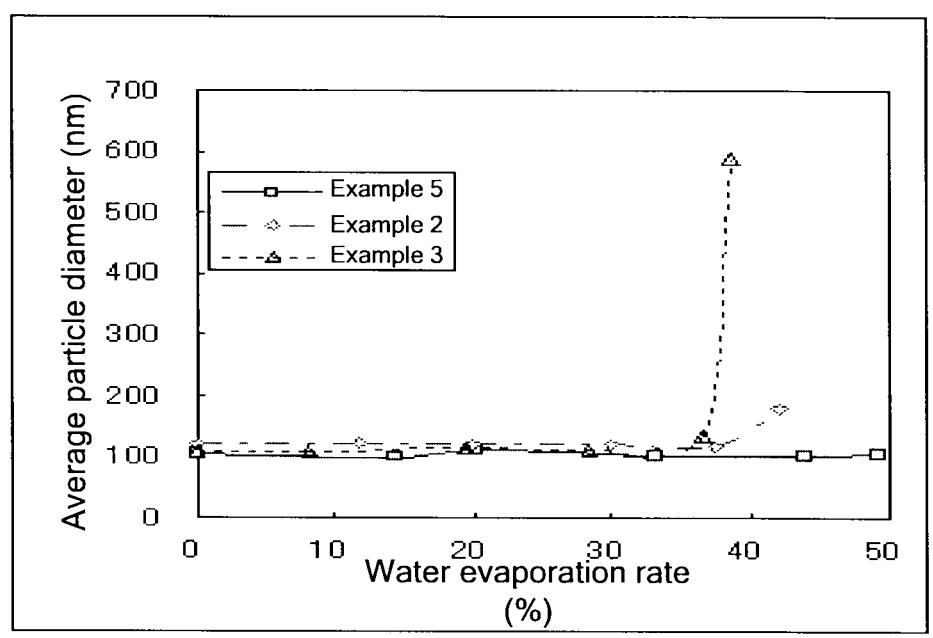
FIG. 3 is a graph showing a relationship between the water-evaporation rate and the particle-size variation in Experiment 2.

Measurement of Viscosity Increase and Particle Size Variation Due to Water Evaporation Each ink for recording obtained in Examples 2, 3 and 5 was left stand in the environment at 50° C. and 10% RH for a certain period of time, and then the change in mass of the ink was measured. The viscosity and the particle diameter at that time were also measured. A particle size distribution measuring instrument UPA 150 supplied from Microtrack was used for the measurement of the particle diameter, which was measured at a dilution of 500 times. The results are shown in FIGS. 2 and 3. In FIG. 2, the water evaporation rate and the viscosity increase rate were obtained from the following formulae:

Water evaporation rate (%)=[(initial weight−weight after water evaporation)/initial weight]×100

Viscosity increase rate=viscosity after water evaporation/initial viscosity

From the results in FIGS. 2 and 3, in each ink for recording obtained in Examples 2, 3 and 5, no remarkable increase of the particle diameters occurred even at water evaporation rate of 35%, and thus it has been found that the ejecting reliability is assured when ejected at the water evaporation rate of less than 30%. From this, it has been found that the ejecting reliability is sufficiently assured even in the ink in which the sum of the solid contents of the water-dispersible coloring agent and the water-dispersible resin is 10% by mass to 30% by mass relative to the entire amount of the ink.

INDUSTRIAL AVAILABILITY

The ink for recording of the present invention can assure high coloring property and image quality, and the reliability, can form the image with high chroma, good color tone and high quality on not only the recording paper made specifically but also the plain paper, and can be suitably used for the ink cartridge, the ink recorded matter, the inkjet recording apparatus and the inkjet recording method.

The inkjet recording apparatus and the inkjet recording method of the present invention can be applied to various recordings by the inkjet recording system, and for example, can be suitably applied to printers for inkjet recording, facsimile apparatuses, copying apparatuses, printer/facsimile/copia composite machines, and the like.

The invention claimed is:
1. An ink jet recording apparatus, comprising
an ink ejecting unit and an ink for recording, wherein the ink ejecting unit is configured to apply a stimulus to the ink for recording so as to eject the ink, and to form an image, wherein the ink for recording comprises:
a coloring agent;
a water-dispersible resin;
a wetting agent, wherein the wetting agent is a polyhydric alcohol having an equilibrium moisture content of 25% by mass or more under the condition at 20° C. and 60% RH;
a fluorine surfactant; and
water,
wherein
a total solid content of the coloring agent and the water-dispersible resin is 10% by mass to 30% by mass with respect to a total mass of the ink,
a ratio B/C is 0.1 to 1.6, wherein B is a solid content of the coloring agent in the ink, and C is a solid content of the water-dispersible resin in the ink,
a viscosity of the ink is 5 mPa·s to 20 mPa·s at 25° C.,
a surface tension of the ink is 35 mN/m or less, and
the total content of the surfactant in the ink is 0.01% by mass to 5% by mass.

2. The inkjet recording apparatus of claim 1, wherein the ink ejecting unit is configured to be responsive to at least one stimulus selected from the group consisting of heat, pressure, vibration and light.

3. The inkjet recording apparatus of claim 1, further comprising an ink cartridge comprising a container, and wherein the ink for recording is housed in the container,
wherein the ink ejecting unit comprises a nozzle head, and a subtank disposed above the nozzle head, wherein the subtank is supplied with the ink for recording from the ink cartridge via a supply tube.

4. The inkjet recording apparatus of claim 1, wherein the coloring agent is a water-dispersible coloring agent comprising a pigment.

5. The inkjet recording apparatus of claim 4, wherein the water-dispersible coloring agent is the pigment which comprises at least one hydrophilic group on a surface thereof, and exhibits either or both water dispersibility and water solubility in the absence of a dispersant.

6. The inkjet recording apparatus of claim 4, wherein the water-dispersible coloring agent is a polymer emulsion comprising polymer particles, each comprising at least one of a water insoluble coloring agent and a coloring agent having poor water solubility.

7. The inkjet recording apparatus of claim 4, wherein the water-dispersible coloring agent is the pigment dispersed in either a surfactant or a water-soluble macromolecular compound having a weight average molecular weight of 50,000 or less.

8. The inkjet recording apparatus of claim 1, wherein the polyhydric alcohol is glycerin, and a content of the glycerin is 60% by mass or less with respect to the total mass of the entire wetting agent.

9. The inkjet recording apparatus of claim 1, wherein the surfactant comprises at least one member selected from the group consisting of a perfluoroalkyl sulfonate compound, a perfluoroalkyl carboxylate compound, a perfluoroalkyl phosphoric ester compound, a perfluoroalkyl ethylene oxide adduct, and polyoxyalkylene ether polymer having a perfluoroalkyl ether group in a side chain thereof.

10. The inkjet recording apparatus of claim 1, wherein the ink for recording is at least one selected from the group consisting of a cyan ink, a magenta ink, a yellow ink and a black ink.

11. An ink recorded matter, comprising
a recording medium; and
an image formed on the recording medium with an ink for recording comprising:
a coloring agent;
a water-dispersible resin;
a wetting agent, wherein the wetting agent is a polyhydric alcohol having an equilibrium moisture content of 25% by mass or more under the condition at 20° C. and 60% RH;
a fluorine surfactant; and
water,
wherein
a total solid content of the coloring agent and the water-dispersible resin is 10% by mass to 30% by mass with respect to a total mass of the ink,
a ratio B/C is 0.1 to 1.6, wherein B is a solid content of the coloring agent in the ink, and C is a solid content of the water-dispersible resin in the ink,
a viscosity of the ink is 5 mPa·s to 20 mPa·s at 25° C.,
a surface tension of the ink is 35 mN/m or less, and
the total content of the surfactant in the ink is 0.01% by mass to 5% by mass.

12. The ink recorded matter of claim 11, wherein the recording medium has a Stockigt size degree of 3 seconds or more.

13. The inkjet recording apparatus of claim 1, wherein the fluorine surfactant is a polyoxyalkylene ether polymer compound having perfluoroalkyl ether groups in the side chain thereof.

14. The inkjet recording apparatus of claim 1, wherein the fluorine surfactant comprises at least one member selected from the group consisting of perfluoroalkyl sulfonic acids, perfluoroalkyl sulfonate salts, perfluoroalkyl carboxylic acids, perfluoroalkyl carboxylate salts, perfluoroalkyl phosphate esters and perfluoroalkyl phosphate ester salts.

15. The inkjet recording apparatus of claim 1, wherein the fluorine surfactant comprises an anionic fluorine surfactant.

16. The inkjet recording apparatus of claim 1, wherein the fluorine surfactant comprises a nonionic fluorine surfactant.

17. The inkjet recording apparatus of claim 1, wherein the fluorine surfactant comprises an ampholytic fluorine surfactant.

* * * * *